(12) United States Patent
Orita et al.

(10) Patent No.: US 12,554,051 B2
(45) Date of Patent: Feb. 17, 2026

(54) OPTICAL FILTER

(71) Applicant: AGC Inc., Tokyo (JP)

(72) Inventors: Yuichiro Orita, Fukushima (JP);
Kazuhiko Shiono, Fukushima (JP);
Motoshi Nakayama, Fukushima (JP);
Takuro Shimada, Fukushima (JP)

(73) Assignee: AGC Inc., Tokyo (JP)

( * ) Notice: Subject to any disclaimer, the term of this patent is extended or adjusted under 35 U.S.C. 154(b) by 768 days.

(21) Appl. No.: 17/663,274

(22) Filed: May 13, 2022

(65) Prior Publication Data

US 2022/0276420 A1 Sep. 1, 2022

Related U.S. Application Data

(63) Continuation of application No. PCT/JP2020/041259, filed on Nov. 4, 2020.

(30) Foreign Application Priority Data

Nov. 15, 2019 (JP) .................. 2019-207414

(51) Int. Cl.
*G02B 5/22* (2006.01)
*G06V 40/13* (2022.01)

(52) U.S. Cl.
CPC .......... *G02B 5/223* (2013.01); *G06V 40/1329* (2022.01)

(58) Field of Classification Search
CPC .. G02B 5/22–5/223; G02B 5/26–5/265; G02B 5/281; C09B 57/007; C09B 23/00–23/168
See application file for complete search history.

(56) References Cited

U.S. PATENT DOCUMENTS

2015/0293283 A1 10/2015 Nara et al.
2017/0066933 A1 3/2017 Shiono et al.
(Continued)

FOREIGN PATENT DOCUMENTS

JP 2015-43061 A 3/2015
JP 6065169 B1 1/2017
(Continued)

OTHER PUBLICATIONS

Machine translation of WO2018043564. Retrieved Dec. 4, 2024.*
International Search Report issued Jan. 26, 2021, in PCT/JP2020/041259, filed on Nov. 4, 2020, 2 pages.

*Primary Examiner* — Prashant J Khatri
(74) *Attorney, Agent, or Firm* — Oblon, McClelland, Maier & Neustadt, L.L.P.

(57) ABSTRACT

An optical filter includes: a transparent substrate; and an absorption layer on the transparent substrate, the absorption layer containing at least one dye (X) having a maximum absorption wavelength in 600 to 1000 nm. A laminate of the transparent substrate and the absorption layer satisfies all of the following characteristics (i-2) to (i-4): (i-2) a maximum internal transmittance in 700 to 850 nm is 35% or lower; (i-3) a difference between the maximum internal transmittance and a minimum internal transmittance in 700 to 850 nm is 20% or smaller; and (i-4) OD(A) and OD(B) satisfy the following relationship: OD(A)/OD(B)<0.07 where OD(A) is an average optical density of an internal transmittance in 500 to 600 nm and OD(B) is an average optical density of an internal transmittance in 700 to 850 nm.

19 Claims, 3 Drawing Sheets

(56) References Cited

U.S. PATENT DOCUMENTS

2019/0161629 A1  5/2019  Shiono et al.
2021/0395609 A1  12/2021  Naito et al.

FOREIGN PATENT DOCUMENTS

| JP | 2018-189725 A | 11/2018 | |
|----|---------------|---------|---|
| JP | 2019-28427 A | 2/2019 | |
| JP | 6549778 B1 | 7/2019 | |
| WO | WO-2018043564 A1 * | 3/2018 | ............... B32B 7/02 |
| WO | WO 2019-022069 A1 | 1/2019 | |
| WO | WO 2019-168090 A1 | 9/2019 | |

* cited by examiner

OPTICAL FILTER

TECHNICAL FIELD

The present invention relates to an optical filter that transmits light in a visible wavelength range and blocks light in a near infrared wavelength range and a fingerprint detection device using the same.

BACKGROUND ART

Fingerprint detection devices which are devices for reading a fingerprint pattern in fingerprint authentication include a capacitance type, a thermal type, an ultrasonic type, an optical type, etc. Among fingerprint detection devices of these types, optical fingerprint detection devices authenticate a fingerprint by analyzing a pattern of a photographed fingerprint. In fingerprint detection devices employed in smartphones etc., for example, an organic thin-film imaging device (CMOS image sensor), an optical filter, and a light-emitting device (LED) are laminated in this order via air layers and its topmost surface is covered with a cover glass.

In optical fingerprint detection devices, light is emitted from the light-emitting device by pushing the cover glass with a finger and is then reflected by the finger surface. A fingerprint is authenticated by taking an image carried by reflection light by the image sensor and analyzing it.

Light emitted from the light-emitting device is green light that is mainly in a wavelength range of 500 to 600 nm. On the other hand, since light in a wavelength range of longer than 600 nm is likely to be transmitted through a living body, when, for example, an optical fingerprint detection device is used outdoors, light in the wavelength range of longer than 600 nm of sunlight etc. is transmitted through a finger and detected by the image sensor and resulting noise lowers the fingerprint authentication accuracy. In view of this, to block, selectively, light in the wavelength range of longer than 600 nm, an optical filter such as a near infrared cutting filter is used.

An optical filter that is increased in absorption in a wavelength range 700 to 780 nm is described in Patent document 1.

An optical filter that is increased in absorption in a wavelength range 600 to 800 nm is described in Patent document 2.

CITATION LIST

Patent Literature

Patent literature 1: WO 2019/168090
Patent literature 2: WO 2019/022069

SUMMARY OF INVENTION

Technical Problems

However, in the optical filter described in Patent literature 1, although the transmittance is relatively high in 500 to 600 nm, in the range of longer than 600 nm, an absorption band is as narrow as about 700 to 800 nm and hence the absorption is insufficient. In another case, in the range of longer than 600 nm, an absorption band is as wide as 700 to 900 nm but the transmittance in 500 to 600 nm is as low as 80% or lower, which is insufficient.

In the optical filter described in Patent literature 2, although the transmittance in 500 to 600 nm is relatively high, in the range of longer than 600 nm, an absorption band is as narrow as about 600 to 800 nm and the absorption is insufficient.

In view of the above, an object of the present invention is to provide an optical filter that can absorb light in a wide part of a near infrared range and is high in the transmittance in a visible range, and a fingerprint detection device using the same.

Solution to Problem

The present invention relates to the following optical filter and an imaging device.

An optical filter including a resin layer containing at least one kind of dye (X) having a maximum absorption wavelength in a wavelength range of 600 to 1000 nm and reflectance adjustment films laminated on two respective surfaces of the resin layer, wherein:

the resin layer satisfies all of the following characteristics (i-1) to (i-3):

(i-1) an average internal transmittance in a wavelength range of 500 to 600 nm is 85% or higher;

(i-2) a maximum internal transmittance in a wavelength range of 700 to 850 nm is 35% or lower; and (i-3) the difference between the maximum internal transmittance and a minimum internal transmittance in the wavelength range of 700 to 850 nm is 20% or smaller.

Advantageous Effect of Invention

The invention can provide an optical filter that can absorb light in a wide part of a near infrared range and is high in the transmittance in a visible range of 500 to 600 nm.

DESCRIPTION OF EMBODIMENTS

Embodiments of the present invention will be hereinafter described.

In this specification, a compound represented by Formula (I) may be abbreviated as "compound (I)" and a dye that is made of a compound represented by Formula (I) may be abbreviated as "dye (I)." The same is true for other formulae.

In this specification, an expression "the transmittance in a specific wavelength range is 90% or higher", for example, means that the transmittance is not lower than 90% throughout the entire wavelength range. Likewise, an expression "the transmittance in a specific wavelength range is 1% or lower", for example, means that the transmittance is not higher than 1% throughout the entire wavelength range. An average transmittance in a specific wavelength range is an arithmetic mean of transmittances measured at intervals of 1 nm over the wavelength range. Likewise, an average of internal transmittance (described later) and an average optical density (described later) are each an arithmetic mean of values measured at intervals of 1 nm over the wavelength range.

In this specification, the term "internal transmittance" is a transmittance that is obtained by removing the influence of interface reflection from a measured transmittance and defined by a formula {measured transmittance/(100−reflectance)}×100. On the other hand, when a word "transmittance" is used alone, it means a measured transmittance.

The terms "reflectance" and "transmittance" mean vertical-incidence reflectance and vertical-incidence transmittance, respectively.

In this specification, the word "to" that is used to indicate a numerical range includes its upper limit and lower limit.

Example configurations of filters according to the invention will be hereinafter described.

An optical filter according to the invention is equipped with a resin layer containing at least one particular kind of dye (X) and reflectance adjustment films laminated on the two respective surfaces of the resin layer.

Figure 1:
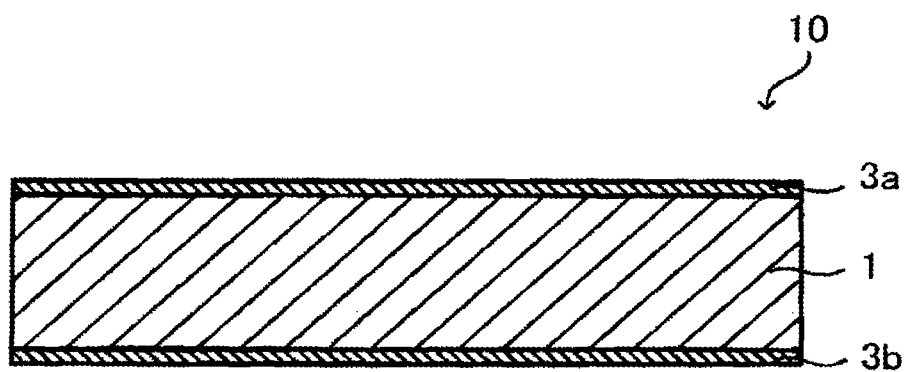
FIG. 1 is a schematic sectional view of an optical filter according to one embodiment of the present invention.

FIG. 1 is a sectional view of an optical filter 10 including a resin layer 1 and reflectance adjustment films 3a and 3b which are respectively laminated on the two surfaces of the resin layer 1. Since the reflectance adjustment films 3a and 3b are respectively laminated on the two surfaces of the resin layer 1, the light resistance and the durability of a dye contained in the resin layer are increased. The reflectance adjustment films 3a and 3b may be either identical or different from each other. To enhance the effect of protecting the dye from moisture, not only the two surfaces but also the entire side surfaces of the resin layer may be covered with the reflectance adjustment films.

Figure 2:
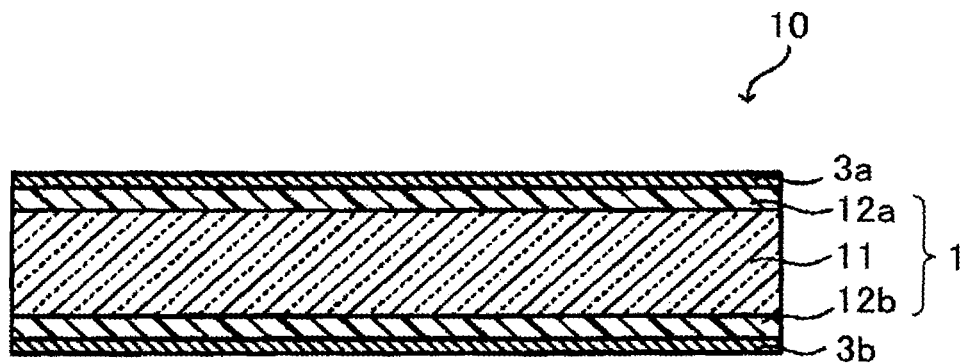
FIG. 2 is a schematic sectional view of an optical filter according to another embodiment of the invention.

FIG. 2 is a sectional view of an optical filter 10 including a transparent substrate 11, absorption layers 12a and 12b which are respectively laminated on the two surfaces of the transparent substrate 11, and reflectance adjustment films 3a and 3b which are laminated on the main surfaces of the absorption layers 12a and 12b, respectively. In FIG. 2, a resin layer 1 includes the transparent substrate 11 and the absorption layers 12a and 12b which are respectively laminated on the two main surfaces of the transparent substrate 11. In the case where an absorption layer itself functions as a substrate (transparent substrate), the resin layer may be made up of only the absorption layer by omitting a transparent substrate as shown in FIG. 1. The absorption layers 12a and 12b may be either identical or different from each other.

The resin layer, the absorption layers, the transparent substrate, and the reflectance adjustment films will be described below.

[Resin Layer]

The resin layer of the optical filter according to the invention satisfies all of the following characteristics (i-1) to (i-3):

(i-1) an average internal transmittance in a wavelength range of 500 to 600 nm is 85% or higher;

(i-2) a maximum internal transmittance in a wavelength range of 700 to 850 nm is 35% or lower; and (i-3) the difference between the maximum internal transmittance and a minimum internal transmittance in the wavelength range of 700 to 850 nm is 20% or smaller.

Since the characteristic (i-1) is satisfied, the optical filter can take in a large amount of visible light, in particular, light in green band of 500 to 600 nm. That is, the optical filter can take in a large amount of light emitted from a light source at the time of fingerprint authentication. The average internal transmittance of the characteristic (i-1) is preferably 87% or higher. There are no particular limitations on the upper limit because the higher the average transmittance value, the more preferable. However, the average is usually 98% or lower.

Since the characteristic (i-2) is satisfied, the optical filter can cut near infrared light in a near infrared range, in particular, in as wide a band as 700 to 850 nm. That is, the optical filter can satisfactorily block light in a specific wavelength range that produces noise at the time of fingerprint authentication. The maximum internal transmittance of the characteristic (i-2) is preferably 30% or lower. There are no particular limitations on the lower limit because the large the maximum internal transmittance value, the more preferable. However, the maximum internal transmittance is usually 1% or higher.

Since the characteristic (i-3) is satisfied, the optical filter can cut near infrared light throughout the entire band of 700 to 850 nm. The difference between the maximum internal transmittance and the minimum internal transmittance of the characteristic (i-3) is preferably 18% or smaller. There are no particular limitations on the lower limit because the smaller the difference, the more preferable. However, the difference is usually 1% or higher.

The above characteristics (i-1) to (i-3) can be satisfied by adjusting the kind and content of the dye contained in the resin layer, the kind of resin, the thickness of the resin layer, etc.

The resin layer preferably satisfies the following characteristic (i-4):

(i-4) When OD(A) represents an average optical density of the internal transmittance in the wavelength range of 500 to 600 nm and OD(B) represents an average optical density of the internal transmittance in the wavelength range of 700 to 850 nm, OD(A) and OD(B) satisfy the following relationship:

$$OD(A)/OD(B)<0.07.$$

The characteristic (i-4) is an index representing the difference between the internal transmittance in the wavelength range of 500 to 600 nm and the internal transmittance in the wavelength range of 700 to 850 nm. OD(A)/OD(B) being smaller means that the difference between the two internal transmittances is higher. Since characteristic (i-4) is satisfied, the optical filter can take in a large amount of light in green band of 500 to 600 nm and cut near infrared light in the 700 to 850 nm band.

An average optical density (OD) of internal transmittance is calculated from an average internal transmittance (TAve) according to the following formula:

$$OD=-log_{10}(T_{Ave}/100).$$

The resin layer preferably satisfies the following characteristic (i-5) which is a characteristic of an even preferable mode of the characteristic (i-4):

(i-5) When OD(A) represents an average optical density of the internal transmittance in 500 to 600 nm and OD(B) represents an average optical density of the internal transmittance in 700 to 850 nm, OD(A) and OD(B) satisfy the following relationship:

$$OD(A)/OD(B)<0.05.$$

The above characteristics (i-4) and (i-5) can be satisfied by adjusting the kind and content of the dye contained in the resin layer, the kind of resin, the thickness of the resin layer, etc.

<Near Infrared Absorbing Dye (X)>

The resin layer of the optical filter according to the invention contains at least one kind of dye (X) that has a maximum absorption wavelength in a wavelength range of 600 to 1000 nm. Since the dye (X) is a near infrared absorbing dye having a maximum absorption wavelength in 600 to 1000 nm (near infrared range), the optical filter functions as a near infrared cutting filter.

As for at least one of the dyes (X), a spectral internal transmittance curve that is measured by dissolving the dye (X) in a resin so that an internal transmittance at a maximum absorption wavelength is 10% preferably satisfies the following characteristic (ii-1):

(ii-1) $E>100-(D/100)$, where D (nm) is the maximum absorption wavelength and E is an average internal transmittance in 500 to 600 nm.

The characteristic (ii-1) defines a relationship between the maximum absorption wavelength and the transmittance in 500 to 600 nm. Near infrared absorbing dyes having an absorption band in a long wavelength range of longer than 600 nm has a tendency that the transmittance is low in the wavelength range of 500 to 600 nm. The characteristic (ii-1) is an index for selection of a dye that has a maximum absorption wavelength in 600 to 1000 nm and high transmittance in 500 to 600 nm. It can be said that the dye (X) that satisfies the characteristic (ii-1) is a dye that is superior in spectral characteristics. It is preferable that at least one kind of dye (X) satisfy the characteristic (ii-1), and it is even preferable that all the dyes (X) satisfy the characteristic (ii-1).

The characteristic (ii-1) defines a characteristic to be satisfied when the dye (X) is actually contained in the resin layer or absorption layers (described later) of the optical filter. Thus, a resin in which the dye (X) is dissolved is preferably a resin that is used for the resin layer or the absorption layers (described later).

Spectral characteristics of a dye in a resin are measured by applying a solution containing the dye and the resin to a substrate. Here, to avoid influence of reflection at the interfaces with air and the interfaces with the substrate, spectral characteristics of the dye are evaluated using an internal transmittance that is calculated according to the following formula:

$$\text{internal transmittance} = \{\text{measured transmittance}/(100-\text{measured reflectance})\} \times 100.$$

At least one kind of the dyes (X) preferably satisfy the following characteristic (ii-2). The characteristic (ii-2) is a characteristic of an even preferable mode of the above characteristic (ii-1). It can be said that the dye (X) that satisfies the characteristic (ii-2) is a dye that is even superior in spectral characteristics.

(ii) $E>103.5-(D/100)$, where D (nm) is the maximum absorption wavelength and E is an average internal transmittance in 500 to 600 nm.

Although at least one kind of dye (X) may satisfy the characteristic (ii-2), it is preferable that all the dyes (X) satisfy the characteristic (ii-2).

As the dye (X), two or more kinds of dyes are preferably used in combination, even preferably three or more kinds of dyes are used in combination. An optical filter having a broad absorption band in a near infrared range can be obtained by combining plural kinds of dyes.

More specifically, the dyes (X) preferably includes one or more compounds selected from compounds (A) having a maximum absorption wavelength in a wavelength range of 600 nm or longer and shorter than 750 nm, one or more compounds selected from compounds (B) having a maximum absorption wavelength in a wavelength range of 750 nm or longer and shorter than 800 nm, and one or more compounds selected from compounds (C) having a maximum absorption wavelength in a wavelength range of 800 nm or longer and shorter than 1000 nm. An optical filter having a broad absorption band in a near infrared range can be obtained by combining dyes having maximum absorption wavelengths in different wavelength ranges.

The content of the dye (X) in the resin layer may be set as appropriate so that the resin layer satisfies the above-mentioned optical characteristics (i-1) to (i-5), and the content of the dye (X) is preferably 0.3 to 25 mass %, even preferably 0.3 to 20 mass %, particularly preferably at 0.5 to 17 mass %. In the case where the content of the dye (X) is in this range, the resin layer satisfies the above optical characteristics (i-1) to (i-5) and the properties of the resin layer can be kept good without lowering Tg of the resin layer and the solubility of the dye (X) in the resin layer. The content of the dye (X) means a content of the dye (X) in the resin layer in the case where the resin layer does not have a transparent substrate and consists of a single resin layer and means a content of the dye (X) in the absorption layers in the case where the resin layer has a transparent substrate and absorption layers.

The content of a compound (A) in the resin layer is preferably 0.1 to 15 mass %, even preferably 1 to 10 mass %.

The content of a compound (B) in the resin layer is preferably 0.1 to 15 mass %, even preferably 1 to 10 mass %.

The content of a compound (C) in the resin layer is preferably 0.1 to 23 mass %, even preferably 0.1 to 15 mass %, and particularly preferably 1 to 10 mass %.

The total content of compounds (A), (B), and (C) is preferably 0.3 to 25 mass %, even preferably 0.3 to 20 mass %.

A compound (A) is preferably at least one compound selected from the group consisting of squarylium dyes and cyanine dyes.

A compound (B) is preferably at least one compound selected from the group consisting of squarylium dyes and cyanine dyes.

A compound (C) is preferably at least one compound selected from the group consisting of squarylium dyes, cyanine dyes, and imonium dyes.

Each dye will be described below.

<Squarylium Dye>

The squarylium dye is preferably a compound that is given by the following formula (I) or (II)

In the case where two or more same symbols exist in a formula representing a squarylium dye compound, they may be either the same or different. The same is true of a cyanine dye compound and an imonium dye compound.

[Chemical formula 1]

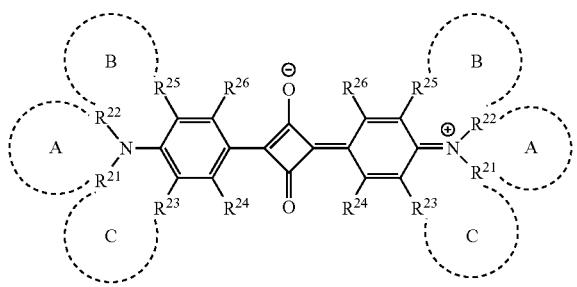

(I)

The meanings of the symbols used in the above formula are as follows.

$R^{24}$ and $R^{26}$ independently represent a hydrogen atom, a halogen atom, a hydroxy group, an alkyl group or alkoxy group having a carbon number of 1 to 20, an acyloxy group having a carbon number of 1 to 10, an aryl group having a carbon number of 6 to 11, an alaryl group having a carbon number of 7 to 18 that may have a substituent and may have an oxygen atom between carbon atoms, —$NR^{27}R^{28}$ ($R^{27}$ and $R^{28}$ are independently a hydrogen atom or an alkyl group having a carbon number of 1 to 20), —C(=O)—$R^{29}$ ($R^{29}$ is a hydrogen atom, a halogen atom, a hydroxy group, a hydrocarbon group having a carbon number of 1 to 25 that may have a substituent and may include, between carbon atoms, an unsaturated bond, an oxygen atom, or a saturated or unsaturated ring structure), —$NHR^{30}$ or —$SO_2$—$R^{30}$ (each $R^{30}$ is a hydrocarbon group having a carbon number of 1 to 25 in which one or more hydrogen atoms may be substituted with a halogen atom, a hydroxy group, a carboxy group, a sulfo group, or a cyano group and that may include, between carbon atoms, an unsaturated bond, an oxygen atom, or a saturated or unsaturated ring structure, or a group represented by the following Formula (S) ($R^{41}$ and $R^{42}$ are independently a hydrogen atom, a halogen atom, an alkoxy group or alkoxy group having a carbon number of 1 to 10; k is 2 or 3).

[Chemical formula 2]

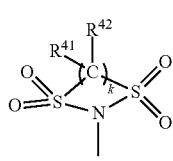

(S)

$R^{21}$ and $R^{22}$, $R^{22}$ and $R^{25}$, and $R^{21}$ and $R^{23}$ may be bonded to each other to form heterocycles A, B, and C, respectively, whose numbers of members are 5 or 6, together with a nitrogen atom.

$R^{21}$ and $R^{22}$ that form the heterocycle A constitute, as a divalent group -Q- obtained by the bonding of them, an alkylene group or an alkyleneoxy group in which a hydrogen atom may be substituted with an alkyl group having a carbon number of 1 to 6, an aryl group having a carbon number of 6 to 10, or an acyloxy group having a carbon number of 1 to 10 that may have a substituent.

$R^{22}$ and $R^{25}$ that form the heterocycle B and $R^{21}$ and $R^{23}$ that form the heterocycle C are, as divalent groups —$X^1$—$Y^1$— and —$X^2$—$Y^2$— (the side bonded to the nitrogen is $X^1$ or $X^2$) obtained by the bonding of them, groups in which each of $X^1$ and $X^2$ is a group represented by the following Formula (1x) or (2x) and each of $Y^1$ and $Y^2$ is a group selected from the following formulae (1y) to (5y). In the case where each of $X^1$ and $X^2$ is a group represented by the following Formula (2x), each of $Y^1$ and $Y^2$ may be a single bond and in this case, an oxygen atom may exist between carbon atoms.

[Chemical formulae 3]

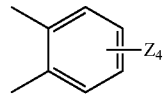
(1x)

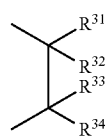
(2x)

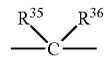
(1y)

(2y)

—O—
(3y)

—S—
(4y)

—Se—
(5y)

In Formula (1x), four Zs independently represent a hydrogen atom, a hydroxy group, an alkyl group or alkoxy group having a carbon number of 1 to 6, or —$NR^{38}R^{39}$ ($R^{38}$ and $R^{39}$ independently represent a hydrogen atom or an alkyl group having a carbon number of 1 to 20). $R^{31}$ to $R^{36}$ independently represent a hydrogen atom, an alkyl group having a carbon number of 1 to 6, or an aryl group having a carbon number of 6 to 10, and $R^{37}$ represents an alkyl group having a carbon number of 1 to 6 or an aryl group having a carbon number of 6 to 10.

$R^{27}$, $R^{28}$, $R^{29}$, $R^{31}$ to $R^{37}$, $R^{21}$ to $R^{23}$ and $R^{25}$ that do not serve to form a heterocycle may form a 5-membered or 6-membered ring by bonding to one of the others. $R^{31}$ and $R^{36}$ may be bonded to each other directly and $R^{31}$ and $R^{37}$ may also be bonded to each other directly.

$R^{21}$, $R^{22}$, $R^{23}$, and $R^{25}$ that do not serve to form a heterocycle may independently be a hydrogen atom, a halogen atom, a hydroxy group, an alkyl group or alkoxy group having a carbon number of 1 to 20, an acyloxy group having a carbon number of 1 to 10, an aryl group having a carbon number of 6 to 11, or an alaryl group having a carbon number of 7 to 18 that may have a substituent and may have an oxygen atom between carbon atoms.

[Chemical formula 4]

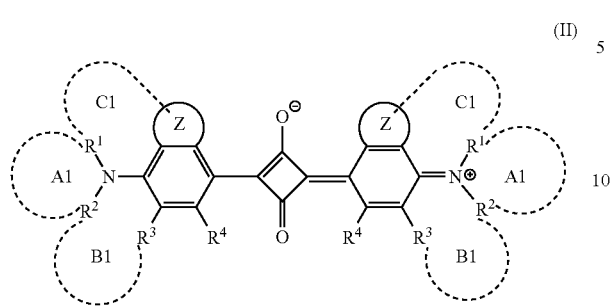

(II)

The meanings of the symbols used in the above formula are as follows.

Rings Z are independently a 5-membered ring or a 6-membered ring having zero to three heteroatoms. A hydrogen atom of each ring Z may be substituted.

$R^1$ and $R^2$, $R^2$ and $R^3$, and $R^1$ and a carbon atom or a heteroatom that is a member of a ring Z may be bonded to each other and form heterocycles A1, B1, and C1, respectively, together with a nitrogen atom. In this case, a hydrogen atom of each of the heterocycle A1, B1, and C1 may be substituted. $R^1$ and $R^2$ that do not form a heterocycle independently represent hydrogen atoms, halogen atoms, or a hydrocarbon group that may include an unsaturated bond, a heteroatom, or a saturated or unsaturated ring structure between carbon atoms and may have a substituent. $R^4$ and $R^3$ that do not form a heterocycle independently represent hydrogen atoms, halogen atoms, or an alkyl group or an alkoxy group that may include a heteroatom between carbon atoms and may have a substituent.

Examples of the compound (I) include compounds that are represented by Formulae (I-1) to (I-3). Among them, the compound represented by Formula (I-1) is particularly preferable from the viewpoints of the solubility in resin, the heat resistance and light resistance in resin, and the visible light transmittance of a resin layer containing the compound.

[Chemical formulae 5]

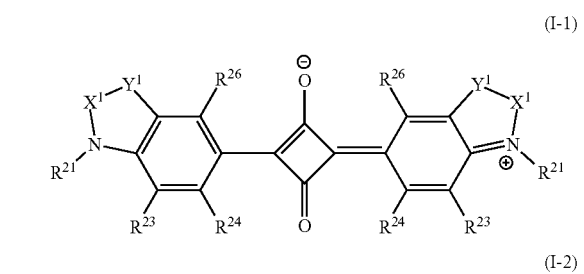

(I-1)

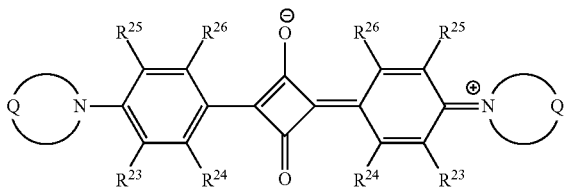

(I-2)

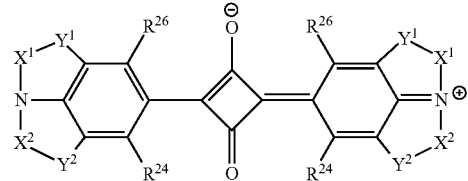

(I-3)

The symbols used in Formulae (I-1) to (I-3) have the same meanings as those used in Formula (I) and their preferable modes are also the same.

In the compound (I-1), $X^1$ is preferably the group (2x) and $Y^1$ is preferably a single bond or the group (1y). In this case, $R^{31}$ to $R^{36}$ are each preferably a hydrogen atom or an alkyl group having a carbon number of 1 to 3 and even preferably a hydrogen atom or a methyl group. Specific examples of —$Y^1$—$X^1$— include divalent organic groups represented by Formulae (11-1) to (12-3).

$$—C(CH_3)_2—CH(CH_3)— \qquad (11\text{-}1)$$

$$—C(CH_3)_2—CH_2— \qquad (11\text{-}2)$$

$$—C(CH_3)_2—CH(C_2H_5)— \qquad (11\text{-}3)$$

$$—C(CH_3)_2—C(CH_3)(nC3H7)— \qquad (11\text{-}4)$$

$$—C(CH_3)_2—CH_2—CH_2— \qquad (12\text{-}1)$$

$$—C(CH_3)_2—CH_2—CH(CH_3)— \qquad (12\text{-}2)$$

$$—C(CH_3)_2—CH(CH_3)—CH_2— \qquad (12\text{-}3)$$

In the compound (I-1), it is preferable that $R^{21}$ be independently a group represented by Formula (4-1) or (4-2) from the viewpoints of solubility, heat resistance, and the steepness of a change around the boundary between a visible range and a near infrared range in a spectral transmittance curve.

[Chemical formulae 6]

In Formulae (4-1) and (4-2), $R^{71}$ to $R^{75}$ independently represent a hydrogen atom, a halogen atom, or an alkyl group having a carbon number of 1 to 4.

In the compound (I-1), $R^{24}$ is preferably —$NR^{27}R^{28}$. As —$NR^{27}R^{28}$, —NH—C(=O)—$R^{29}$ or —NH—$SO_2$—$R^{30}$ is preferable from the viewpoint of the solubility in resin and a coating solvent.

Formula (I-11) shows a compound in which $R^{24}$ of the compound (I-1) is —NH—C(=O)—$R^{29}$.

[Chemical formula 7]

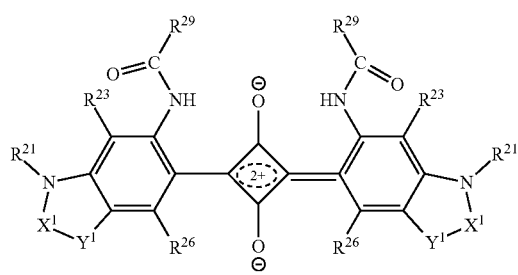

(I-11)

It is preferable that $R^{23}$ and $R^{26}$ be independently a hydrogen atom, a halogen atom, or an alkyl group or an alkoxy group having a carbon number of 1 to 6. A hydrogen atom is even preferable for both.

$R^{29}$ is preferably an alkyl group having a carbon number of 2 to 20 that may have a substituent, an aryl group having a carbon number of 6 to 10 that may have a substituent, or an alaryl group having a carbon number of 7 to 18 that may have a sub stituent and may have an oxygen atom between carbon atoms. Example of substituents include a hydroxy group, a carboxy group, a sulfo group, a cyano group, an alkyl group having a carbon number of 1 to 6, a fluoroalkyl group having a carbon number of 1 to 6, an alkoxy group having a carbon number of 1 to 6, and an acyloxy group having a carbon number of 1 to 6.

$R^{29}$ is preferably a group selected from a linear, branched, or cyclic alkyl group having a carbon number of 2 to 17, a phenyl group that may be substituted with an alkoxy group having a carbon number of 1 to 6, and an alaryl group having a carbon number of 7 to 18 that may have an oxygen atom between carbon atoms.

It is also preferable that $R^{29}$ be independently a hydrocarbon group having a carbon number of 5 to 25 having at least one branch in which one or more hydrogen atoms may be substituted with a hydroxy group, a carboxy group, a sulfo group, or a cyano group and that may include an unsaturated bond, an oxygen atom, or a saturated or unsaturated ring structure between carbon atoms.

Formula (I-12) represents a compound in which $R^{24}$ of the compound (I-1) is —NH—$SO_2$—$R^{30}$.

[Chemical formula 8]

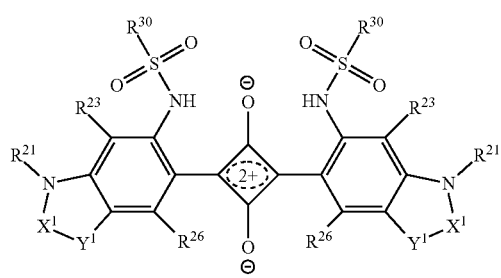

(I-12)

It is preferable that $R^{23}$ and $R^{26}$ be independently a hydrogen atom, a halogen atom, or an alkyl group or alkoxy group having a carbon number of 1 to 6. A hydrogen atom is even preferable for both.

From the viewpoint of light resistance, it is preferable that $R^{30}$ be independently an alkyl group or alkoxy group having a carbon number of 1 to 12 that may have a branch or a hydrocarbon group having a carbon number of 6 to 16 having an unsaturated ring structure. Examples of the unsaturated ring structure include benzene, toluene, xylene, furan, and benzofuran. It is even preferable that $R^{30}$ be independently an alkyl group or alkoxy group having a carbon number of 1 to 12 that may have a branch. All or part of the hydrogen atoms of each group represented by $R^{30}$ may be substituted with a halogen atom, in particular, a fluorine atom.

Examples of the compound (II) include compounds represented by Formulae (II-1) to (II-3), among which the compound represented by Formula (II-3) is particularly preferable from the viewpoints of the solubility in resin and the visible light transmittance of a resin layer containing the compound.

[Chemical formulae 9]

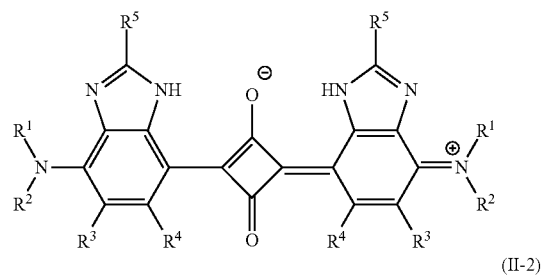

(II-1)

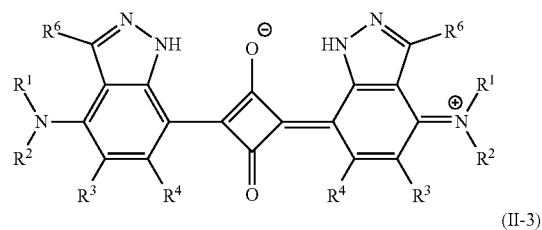

(II-2)

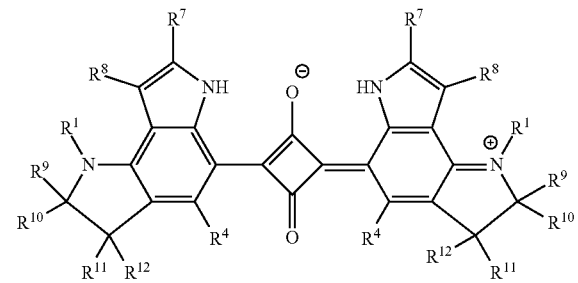

(II-3)

In Formulae (II-1) and (II-2), $R^1$ and $R^2$ independently represent a hydrogen atom, a halogen atom, or an alkyl group having a carbon number of 1 to 15 that may have a substituent and $R^3$ to $R^6$ independently represent a hydrogen atom, a halogen atom, or an alkyl group having a carbon number of 1 to 10 that may have a substituent.

In Formula (II-3), $R^1$, $R^4$, and $R^9$ to $R^{12}$ independently represent a hydrogen atom, a halogen atom, or an alkyl group having a carbon number of 1 to 15 that may have a substituent and $R^7$ and $R^8$ independently represent a hydrogen atom, a halogen atom, or an alkyl group having a carbon number of 1 to 5 that may have a substituent.

In the compounds (II-1) and (II-2), from the viewpoints of the solubility in resin and visible light transmittance, etc., it is preferable that $R^1$ and $R^2$ be independently an alkyl group having a carbon number of 1 to 15, further preferably an alkyl group having a carbon number of 7 to 15. It is further preferable that at least one of $R^1$ and $R^2$ be an alkyl group having a branched chain having a carbon number of 7 to 15. It is particularly preferable that both of $R^1$ and $R^2$ be an alkyl group having a branched chain having a carbon number of 8 to 15.

In the compound (II-3), it is preferable that $R^1$ be independently an alkyl group having a carbon number of 1 to 15 from the viewpoints of the solubility in transparent resin, and visible light transmittance, etc., even preferably an alkyl group having a carbon number of 1 to 10 and particularly preferably an ethyl group or an isopropyl group.

From the viewpoints of visible light transparency and ease of synthesis, $R^4$ is preferably a hydrogen atom or a halogen atom and particularly preferably a hydrogen atom.

It is preferable that $R^7$ and $R^8$ be independently a hydrogen atom, a halogen atom, or an alkyl group having a carbon number of 1 to 5 that may be substituted with a halogen atom, even preferably a hydrogen atom, a halogen atom, or a methyl group.

It is preferable that $R^9$ to $R^{12}$ be independently a hydrogen atom, a halogen atom, or an alkyl group having a carbon number of 1 to 5 that may be substituted with a halogen atom.

Examples of $-CR^9R^{10}-CR^{11}R^{12}-$ include divalent organic groups represented by the following Formulae (13-1) to (13-5):

  (13-1)

  (13-2)

  (13-3)

  (13-4)

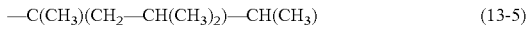  (13-5)

Each of the compounds (I) and (II) can be manufactured by a known method. The compound (I) can be manufactured by the methods described in the specifications of U.S. Pat. No. 5,543,086, US-A-2014-0061505, and WO 2014/088063. The compound (II) can be manufactured by the method described in the specification of WO 2017/135359.

<Cyanine Dye>

The cyanine dye is preferably a compound that is given by Formula (III) or (IV).

[Chemical formulae 10]

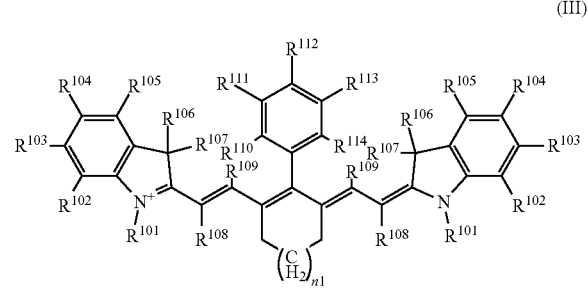

(III)

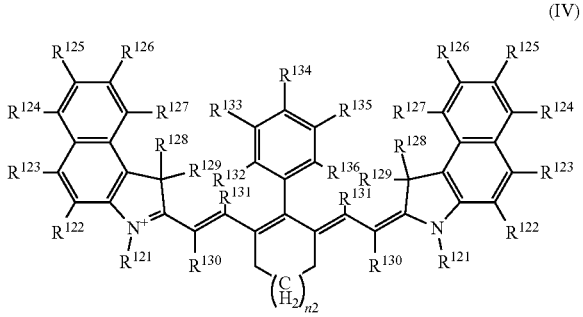

(IV)

The meanings of the symbols used in the above formulae are as follows.

$R^{101}$ to $R^{109}$ and $R^{121}$ to $R^{131}$ independently represent a hydrogen atom, a halogen atom, an alkyl group having a carbon number of 1 to 15 that may have a substituent, or an aryl group having a carbon number of 5 to 20. $R^{110}$ to $R^{114}$ or $R^{132}$ and $R^{136}$ independently represent a hydrogen atom, a halogen atom, or an alkyl group having a carbon number of 1 to 15.

$X^-$ represents a monovalent anion.

Symbols n1 and n2 are each 0 or 1. A hydrogen atom that is bonded to A a carbon ring including $-(CH_2)_{n1}-$ or a carbon ring including $-(CH_2)_{n2}-$ may be substituted with a halogen atom, an alkyl group having a carbon number of 1 to 15 that may have a substituent, or an aryl group having a carbon number of 5 to 20.

In the above description, the alkyl group (including an alkyl group that is part of an alkoxy group) may be of a straight chain and include a branch structure or a saturated ring structure. The aryl group means a group that is bonded via a carbon atom of an aromatic ring of an aromatic compound, for example, a benzene ring, a naphthalene ring, biphenyl, a furan ring, a thiophene ring, or a pyrrole ring. Examples of the substituent in an alkyl group or an alkoxy group having a carbon number of 1 to 15 or an aryl group having a carbon number of 5 to 20 that may have a substituent include a halogen atom and an alkoxy group having a carbon number of 1 to 10.

In Formulae (III) and (IV), $R^{101}$ and $R^{121}$ are preferably an alkoxy group having a carbon number of 1 to 15 or an aryl group having a carbon number of 5 to 20 and, from the viewpoint of maintaining a high visible light transmittance in a resin, it is even preferable that they be an alkoxy group having a carbon number of 1 to 15.

In Formulae (III) and (IV), it is preferable that $R^{102}$ to $R^{105}$, $R^{108}$, and $R^{109}$ or $R^{122}$ to $R^{127}$, $R^{130}$ and $R^{131}$ be independently a hydrogen atom, an alkyl group or an alkoxy group having a carbon number of 1 to 15 or an aryl group having a carbon number of 5 to 20 and, from the viewpoint of obtaining a high visible light transmittance, it is even preferable that they be a hydrogen atom.

In Formulae (III) and (IV), it is preferable that $R^{110}$ to $R^{114}$ and $R^{132}$ to $R^{136}$ be independently a hydrogen atom or an alkyl group having a carbon number of 1 to 15 and, from the viewpoint of obtaining a high visible light transmittance, it is even preferable that they be a hydrogen atom.

It is preferable that $R^{106}$, $R^{107}$, $R^{128}$ and $R^{129}$ be independently a hydrogen atom, an alkyl group having a carbon number of 1 to 15, or an aryl group having a carbon number of 5 to 20 (it may include a chainlike, cyclic, or branched alkyl group), even preferably a hydrogen atom or an alkyl group having a carbon number of 1 to 15. It is preferable that $R^{106}$ and $R^{107}$ be the same group and $R^{128}$ and $R^{129}$ be the same group. Examples of $X^-$ include $I^-$, $BF_4^-$, $PF_6^-$, $ClO_4^-$, and anions given by Formulae (X1) and (X2), among which $BF_4^-$ and $PF_6^-$ are preferable.

[Chemical formulae 11]

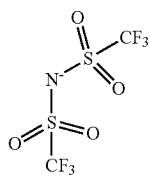

(X1)

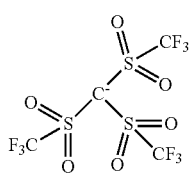

(X2)

The dyes (III) and (IV) are different from each other in skeleton as indicated above and hence are different from each other in maximum absorption wavelength range. In the dye (III), a maximum absorption wavelength is approximately in a wavelength range of 760 to 830 nm though it depends on the kinds and combination of atoms and of groups that are bonded to the skeleton. In the dye (IV), a maximum absorption wavelength is approximately in a wavelength range of 800 to 900 nm though it depends on the kinds and combination of atoms and groups that are bonded to the skeleton.

Furthermore, in the dye (III), a maximum absorption wavelength when n1 in the skeleton is 1 is different from that in the case where n1 is 0. A maximum absorption wavelength is approximately in a wavelength range of 760 to 800 nm when n1 is 1 and is approximately in a wavelength range of 800 to 830 nm when n1 is 0 though it depends on the kinds and combination of atoms and groups that are bonded to the skeleton.

Likewise, in the dye (IV), a maximum absorption wavelength when n2 in the skeleton is 1 is different from that in the case where n2 is 0. A maximum absorption wavelength is approximately in a wavelength range of 800 to 830 nm when n2 is 1 and is approximately in a wavelength range of 830 to 900 nm when n2 is 0 though it depends on the kinds and combination of atoms and groups that are bonded to the skeleton (A21).

For example, the dyes (III) and (IV) can be manufactured by the methods described in Dyes and Pigments 73 (2007), 344-352 and J. Heterocyclic Chem., 42, 959 (2005).

<Imonium Dye>

The imonium dye is preferably a compound that is given by Formula (V) or (VI).

[Chemical formulae 12]

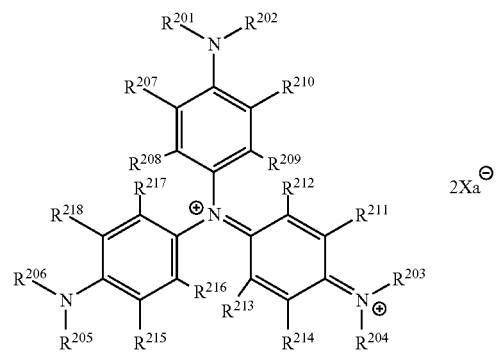

(V)

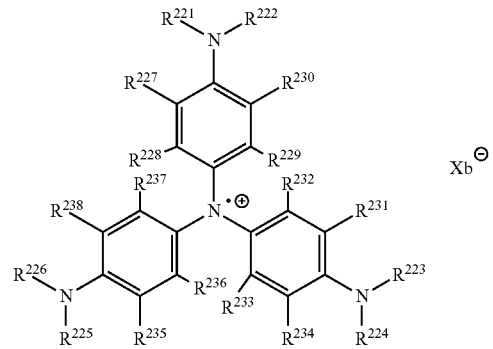

(VI)

The meanings of the symbols used in the above formulae are as follows. $R^{201}$ to $R^{206}$ and $R^{221}$ to $R^{226}$ independently represent a hydrogen atom, a halogen atom, a sulfo group, a hydroxy group, a cyano group, a nitro group, a carboxyl group, a phosphate group, an alkyl group or alkoxy group having a carbon number of 1 to 20 that may have an oxygen atom between carbon atoms and may be substituted, an aryl group having a carbon number of 6 to 14 that may be substituted, an aralkyl group having a carbon number of 7 to 14 that may be substituted, or a 3- to 14-membered heterocycle group that may be substituted. Groups in which a substituted or non-substituted amino group is bonded to a phenyl group are excluded.

$R^{207}$ to $R^{218}$ and $R^{227}$ to $R^{238}$ independently represent a hydrogen atom, a halogen atom, an amino group that may be substituted, an amide group, a cyano group, a nitro group, a carboxyl group, or an alkyl group or alkoxy group having a carbon number of 1 to 12 that may be substituted with a halogen atom.

In $R^{201}$ to $R^{206}$ and $R^{221}$ to $R^{226}$, examples of a substituent in the alkyl group or alkoxy group having a carbon number of 1 to 20 that may be substituted, the aryl group having a carbon number of 6 to 14 that may be substituted, the aralkyl group having a carbon number of 7 to 14 that may be substituted, or the 3- to 14-membered heterocycle group that may be substituted include a halogen atom, an hydroxy group, an amino group that may be substituted with an alkyl group having a carbon number of 1 to 6, a carboxyl group, a sulfo group, a cyano group, and an acyloxy group having a carbon number of 1 to 6.

It is preferable that $R^{207}$ to $R^{218}$ and $R^{227}$ to $R^{238}$ be independently a hydrogen atom, a halogen atom, or an alkyl group or alkoxy group having a carbon number of 1 to 12, even preferably a hydrogen atom or an alkyl group or alkoxy group having a carbon number of 1 to 12. The number of carbons of the alkyl group or alkoxy group is preferably 1 to 6, even preferably 1 to 4.

Examples of $Xa^-$ and $Xb^-$ independently include $Cl^-$, $Br^-$, $I^-$, $F^-$, $ClO_4^-$, $BF_4^-$, $PF_6^-$, $SbF_6^-$, $CF_3SO_3^-$, $CH_3C_6H_4SO_3^-$, $N[SO_2R_f]_2^-$, and $C[SO_2R_f]_3^-$.

Symbol "$R_f$" used above represents a fluoroalkyl group having a carbon number of 1 to 4. A fluoroalkyl group having a carbon number of 1 or 2 is preferable and a fluoroalkyl group having a carbon number of 1 is even preferable. In the case where the carbon number is in this range, the durability such as heat resistance and moisture resistance and the solubility in an organic solvent (described later) are high. Example of such groups represented by Rf include perfluoroalkyl groups such as —$CF_3^-$, —$C_2F_5^-$, —$C_3F_7^-$, and —$C_4F_9$ and —$C_2F_4H$, —$C_3F_6H$, and —$C_4F_8H$. From the viewpoint of moisture resistance, the above-mentioned fluoroalkyl group is preferably a perfluoroalkyl group, even preferably a trifluoromethyl group.

It is preferable that $Xa^-$ and $Xb^-$ independently represent $I^-$, $BF_4^-$, $SbF_6^-$, $PF_6^-$, $ClO_4^-$, $N[SO_2CF_3]_2^-$, $C[SO_2CF_3]_3^-$, etc. $SbF_6^-$, $PF_6^-$, and $N[SO_2CF_3]_2^-$ are preferable and $PF_6^-$ and $N[SO_2CF_3]_2^-$ are even preferable in that the difference between the optical characteristics in a dichloromethane solution and those in resin are small. $BF^{4-}$, $PF_6^-$, and $N[SO_2CF_3]_2^-$ are preferable from the viewpoint of light resistance.

Here, the dye (V) is classified into two kinds of dyes represented by the following Formulae (Va) and (Vb) on the basis of the structures of groups that are bonded to the nitrogen atoms that are bonded, at position 4, to the three respective phenyl groups bonded to the center nitrogen atom. Likewise, the dye (VI) is classified into two kinds of dyes represented by the following Formulae (VIa) and (VIb) on the basis of the structures of groups that are bonded to the nitrogen atoms that are bonded, at position 4, to the three respective phenyl groups bonded to the center nitrogen atom.

The dyes (Va) and (VIa) have a structure where none of the nitrogen atoms bonded to the three respective phenyl groups at position 4 (hereinafter referred to as a "position-4 nitrogen atoms") form a heterocycle.

The dyes (Vb) and (VIb) have a structure where at least one of the pairs of groups bonded to the three respective nitrogen atoms at 4-position are bonded to each other to form a heterocycle. Among the pairs of the groups bonded to the three respective nitrogen atoms at 4-position, two pairs of the groups may be respectively bonded to each other, and all of the three pairs of the groups may be bonded to each other.

[Chemical formulae 13]

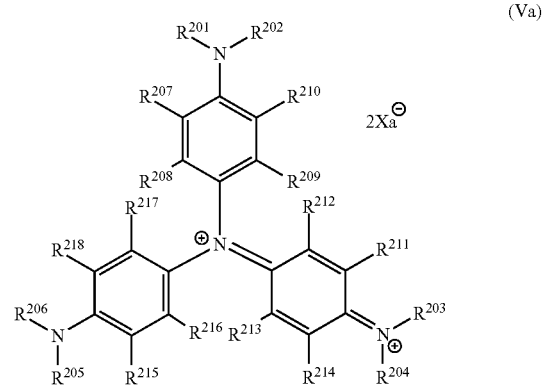

(Va)

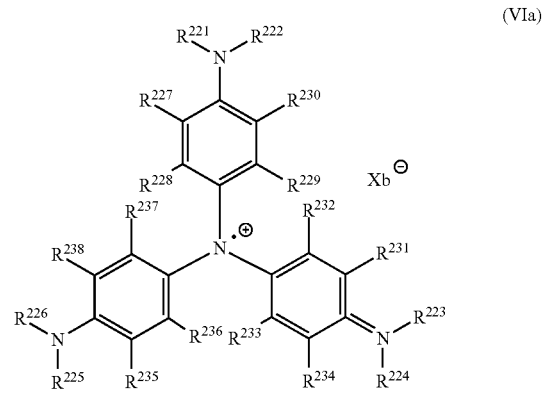

(VIa)

In Formulae (Va) and (VIa), $R^{201}$ to $R^{206}$ and $R^{221}$ to $R^{226}$ are independently a hydrogen atom, a halogen atom, a sulfo group, a hydroxy group, a cyano group, a nitro group, a carboxyl group, a phosphate group, an alkyl group or alkoxy group having a carbon number of 1 to 20 that may have an oxygen atom between carbon atoms and may be substituted, an aryl group having a carbon number of 6 to 14 that may be substituted, an aralkyl group having a carbon number of 7 to 14 that may be substituted, or a 3- to 14-membered heterocycle group that may be substituted. Groups in which a substituted or non-substituted amino group is bonded to a phenyl group are excluded. It is preferable that $R^{201}$ to $R^{206}$ and $R^{221}$ to $R^{226}$ be independently an alkyl group having a carbon number of 1 to 12, even preferably an alkyl group having a carbon number of 1 to 8. $R^{207}$ to $R^{218}$ and $R^{227}$ to $R^{238}$ can be independently the same as those in Formulae (V) or (VI).

[Chemical formulae 14]

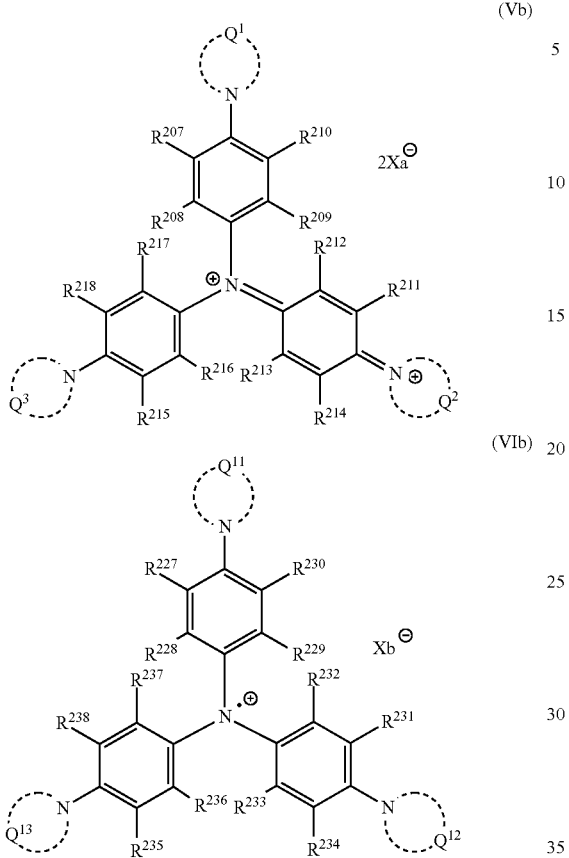

In Formula (Vb), $Q^1$, $Q^2$, and $Q^3$ are divalent groups each of which forms, as a result of bonding of $R^{201}$ and $R^{202}$, $R^{203}$ and $R^{204}$, and $R^{205}$ and $R^{206}$ respectively in Formula (V), a 3 to 8-membered heterocycle together with the nitrogen atom to which $R^{201}$ and $R^{202}$, $R^{203}$ and $R^{204}$, or $R^{205}$ and $R^{206}$ have been bonded. In Formula (VIb), $Q^{11}$, $Q^{12}$, and $Q^{13}$ are divalent groups each of which forms, as a result of bonding of $R^{221}$ and $R^{222}$, $R^{223}$ and $R^{224}$, and $R^{225}$ and $R^{226}$ respectively in Formula (VI), a 3- to 8-membered heterocycle together with the nitrogen atom to which $R^{221}$ and $R^{222}$, $R^{223}$ and $R^{224}$, or $R^{225}$ and $R^{226}$ have been bonded.

In Formulae (Vb) and (VIb), it suffices that at least one of $Q^1$ to $Q^3$ or at least one of Q11 to $Q^{13}$ exist, two or more of $Q^1$ to $Q^3$ or $Q^{11}$ to $Q^{13}$ may exist, and all three of $Q^1$ to $Q^3$ or Q11 to $Q^{13}$ may exist. Hydrogen atoms that are bonded to $Q^1$ to $Q^3$ or Q11 to $Q^{13}$ may be independently substituted with alkyl groups having a carbon number of 1 to 12.

It is preferable that $Q^1$ to $Q^3$ or $Q^{11}$ to $Q^{13}$ be independently an alkylene group that is represented by —$(CH_2)_{n1}$— (n1: integer of 2 to 7). A hydrogen atom of the alkylene group may be substituted with an alkyl group having a carbon number of 1 to 12.

The groups of $R^{201}$ to $R^{206}$ and $R^{221}$ to $R^{226}$ in the case where the groups do not form a heterocycle can be independently the same as the groups of the corresponding $R^{201}$ to $R^{206}$ of Formula (Va) or $R^{221}$ to $R^{226}$ of Formula (VIa). $R^{207}$ to $R^{218}$ and $R^{227}$ to $R^{238}$ can be independently the same as those in Formulae (V) or (VI).

More specific examples of the dye (Va) and the dye (VIa) include compounds in which $R^{201}$ to $R^{218}$ and $R^{221}$ to $R^{238}$ are as shown in the following Table 1 and Table 2, respectively. In these examples of the dye (Va), since $R^{201}$, $R^{203}$ and $R^{205}$ are the same group, in Table 1 they are shown together in one box. Likewise, $R^{202}$, $R^{204}$, and $R^{206}$ are shown together in one box. As for $R^{207}$ to $R^{218}$, substituents located at the same position in the three phenyl groups bonded to the center nitrogen atom are shown together like "$R^{207}$, $R^{211}$, $R^{215}$," "$R^{208}$, $R^{212}$, $R^{216}$," "$R^{209}$, $R^{213}$, $R^{217}$," and "$R^{210}$, $R^{214}$, $R^{218}$." Such substituents of the dye (VIa) are shown according to the same manner.

In dyes (Va-21) and (Va-23) in Table 1, a divalent group that is formed by bonding of each of three pairs of groups adjacent to each other, that is, $R^{207}$ and $R^{208}$, $R^{211}$ and $R^{212}$, and $R^{215}$ and $R^{216}$ is shown in a merged box of "$R^{207}$, $R^{211}$, $R^{215}$" and "$R^{208}$, $R^{212}$ $R^{216}$." In a dye (Va-22), a divalent group that is formed by connection of each of three pairs of groups adjacent to each other, that is, $R^{209}$ and $R^{210}$, $R^{213}$ and $R^{214}$, and $R^{217}$ and $R^{218}$ is shown in a merged box of "$R^{209}$, $R^{213}$, $R^{217}$" "$R^{210}$, $R^{214}$, $R^{218}$." In Table 2, dyes (VIa-21), (VIa-22), and (VIa-23) are shown according to the same method.

Although Xa⁻ and Xb⁻ are not shown in Tables 1 and 2, in each compound, Xa⁻ and Xb⁻ are independently Cl⁻, Br⁻, I⁻, F⁻, $ClO_4^-$, $BF_4^-$, $PF_6^-$, $SbF_6^-$, $CF_3SO_3^-$, $CH_3C_6H_4SO_3^-$, $N[SO_2Rf]_2^-$, or $C[SO_2Rf]_3^-$.

Codes of dyes corresponding to the above preferable monovalent anions are as follows. A dye (Va-1) in which Xa⁻ is I⁻ is given a dye code (Va-1I). A dye (Va-1) in which Xa⁻ is BF4 is given a dye code (Va-1B). A dye (Va-1) in which Xa⁻ is SbF6⁻ is given a dye code (Va-1Sb). A dye (Va-1) in which Xa⁻ is PF6⁻ is given a dye code (Va-1P). A dye (Va-1) in which Xa⁻ is $CLO_4^-$ is given a dye code (Va-1Cl). A dye (Va-1) in which Xa⁻ is $N[SO_2CF_3]_2^-$ is given a dye code (Va-1NS). A dye (Va-1) in which Xa is $C[SO_2CF_3]_3^-$ is given a dye code (Va-1CS). The same is true of the other dyes shown in Tables 1 and 2. In Tables 1 and 2, Ph means a phenyl group and all alkyl groups such as —$C_3H_7$ are a straight chain alkyl group.

TABLE 1

| | | Substituent | | | |
|---|---|---|---|---|---|
| Dye code | $R^{201}$, $R^{203}$, $R^{205}$ | $R^{202}$, $R^{204}$, $R^{206}$ | $R^{207}$, $R^{211}$, $R^{215}$ | $R^{208}$, $R^{212}$, $R^{216}$ | $R^{209}$, $R^{213}$, $R^{217}$ | $R^{210}$, $R^{214}$, $R^{218}$ |
| Va-1 | —$C_2H_5$ | —$C_2H_5$ | H | H | H | H |
| Va-2 | —$C_3H_7$ | —$C_3H_7$ | H | H | H | H |
| Va-3 | —$CH(CH_3)(CH_3)$ | —$CH(CH_3)(CH_3)$ | H | H | H | H |
| Va-4 | —$C_4H_9$ | —$C_4H_9$ | H | H | H | H |
| Va-5 | —$CH_2$—$CH(CH_3)(CH_3)$ | —$CH_2$—$CH(CH_3)(CH_3)$ | H | H | H | H |
| Va-6 | —$C_6H_{13}$ | —$C_6H_{13}$ | H | H | H | H |
| Va-7 | —$C_8H_{17}$ | —$C_8H_{17}$ | H | H | H | H |

TABLE 1-continued

| Dye code | $R^{201}, R^{203}, R^{205}$ | $R^{202}, R^{204}, R^{206}$ | $R^{207}, R^{211}, R^{215}$ | $R^{208}, R^{212}, R^{216}$ | $R^{209}, R^{213}, R^{217}$ | $R^{210}, R^{214}, R^{218}$ |
|---|---|---|---|---|---|---|
| Va-8 | —CH$_2$—CH(C$_2$H$_5$)(C$_4$H$_9$) | —CH$_2$—CH(C$_2$H$_5$)(C$_4$H$_9$) | H | H | H | H |
| Va-9 | —C$_{12}$H$_{23}$ | —C$_{12}$H$_{25}$ | H | H | H | H |
| Va-10 | —CH$_2$—CH(C$_8$H$_{17}$)(C$_6$H$_{13}$) | —CH$_2$—CH(C$_8$H$_{17}$)(C$_6$H$_{13}$) | H | H | H | H |
| Va-11 | —CH$_2$—O—C$_4$H$_9$ | —CH$_2$—O—C$_4$H$_9$ | H | H | H | H |
| Va-12 | —CH$_2$—Ph | —CH$_2$—Ph | H | H | H | H |
| Va-13 | —Ph—CH$_3$ | —Ph—CH$_3$ | H | H | H | H |
| Va-14 | —C$_4$H$_9$ | —C$_4$H$_9$ | H | H | H | —CH$_3$ |
| Va-15 | —CH$_2$—CH(CH$_3$)(CH$_3$) | —CH$_2$—CH(CH$_3$)(CH$_3$) | H | H | H | —CH$_3$ |
| Va-16 | —CH$_2$—CH(CH$_3$)(CH$_3$) | —CH$_2$—CH(CH$_3$)(CH$_3$) | H | H | H | —CF$_3$ |
| Va-17 | —C$_4$H$_9$ | —C$_4$H$_9$ | H | —CH$_3$ | H | H |
| Va-18 | —CH$_2$—CH(CH$_3$)(CH$_3$) | —CH$_2$—CH(CH$_3$)(CH$_3$) | H | —CH$_3$ | H | H |
| Va-19 | —C$_4$H$_9$ | —C$_4$H$_9$ | H | H | H | —O—CH$_3$ |
| Va-20 | —CH$_2$—CH(CH$_3$)(CH$_3$) | —CH$_2$—CH(CH$_3$)(CH$_3$) | H | H | H | —O—CH$_3$ |
| Va-21 | —CH$_2$—CH(CH$_3$)(CH$_3$) | —CH$_2$—CH(CH$_3$)(CH$_3$) | —CH=CH—CH=CH— | | H | H |
| Va-22 | —C$_4$H$_9$ | —C$_4$H$_9$ | H | H | CH$_2$—CH=CH— | |
| Va-23 | CH$_2$—CH(CH$_3$)(CH$_3$) | CH$_2$—CH(CH$_3$)(CH$_3$) | —N=CH—NH— | | H | H |

TABLE 2

| Dye code | $R^{221}, R^{223}, R^{225}$ | $R^{222}, R^{224}, R^{226}$ | $R^{227}, R^{231}, R^{235}$ | $R^{228}, R^{232}, R^{236}$ | $R^{229}, R^{233}, R^{237}$ | $R^{230}, R^{234}, R^{238}$ |
|---|---|---|---|---|---|---|
| VIa-1 | —C$_2$H$_5$ | —C$_2$H$_5$ | H | H | H | H |
| VIa-2 | —C$_3$H$_7$ | —C$_3$H$_7$ | H | H | H | H |
| VIa-3 | —CH(CH$_3$)(CH$_3$) | —CH(CH$_3$)(CH$_3$) | H | H | H | H |
| VIa-4 | —C$_4$H$_9$ | —C$_4$H$_9$ | H | H | H | H |
| VIa-5 | —CH$_2$—CH(CH$_3$)(CH$_3$) | —CH$_2$—CH(CH$_3$)(CH$_3$) | H | H | H | H |
| VIa-6 | —C$_6$H$_{13}$ | —C$_6$H$_{13}$ | H | H | H | H |
| VIa-7 | —C$_8$H$_{17}$ | —C$_8$H$_{17}$ | H | H | H | H |
| VIa-8 | —CH$_2$—CH(C$_2$H$_5$)(C$_4$H$_9$) | —CH$_2$—CH(C$_2$H$_5$)(C$_4$H$_9$) | H | H | H | H |
| VIa-9 | —C$_{12}$H$_{25}$ | —C$_{12}$H$_{25}$ | H | H | H | H |
| VIa-10 | —CH$_2$—CH(C$_8$H$_{17}$)(C$_6$H$_{13}$) | —CH$_2$—CH(C$_8$H$_{17}$)(C$_6$H$_{13}$) | H | H | H | H |
| VIa-11 | —CH$_2$—O—C$_4$H$_9$ | —CH$_2$—O—C$_4$H$_9$ | H | H | H | H |
| VIa-12 | —CH$_2$—Ph | —CH$_2$—Ph | H | H | H | H |
| VIa-13 | —Ph—CH$_3$ | —Ph—CH$_3$ | H | H | H | H |
| VIa-14 | —C$_4$H$_9$ | —C$_4$H$_9$ | H | H | H | —CH$_3$ |
| VIa-15 | —CH$_2$—CH(CH$_3$)(CH$_3$) | —CH$_2$—CH(CH$_3$)(CH$_3$) | H | H | H | —CH$_3$ |
| VIa-16 | —CH$_2$—CH(CH$_3$)(CH$_3$) | —CH$_2$—CH(CH$_3$)(CH$_3$) | H | H | H | —CF$_3$ |
| VIa-17 | —C$_4$H$_9$ | —C$_4$H$_9$ | H | —CH$_3$ | H | H |
| VIa-18 | —CH$_2$—CH(CH$_3$)(CH$_3$) | —CH$_2$—CH(CH$_3$)(CH$_3$) | H | —CH$_3$ | H | H |
| VIa-19 | —C$_4$H$_9$ | —C$_4$H$_9$ | H | H | H | —O—CH$_3$ |
| VIa-20 | —CH$_2$—CH(CH$_3$)(CH$_3$) | —CH$_2$—CH(CH$_3$)(CH$_3$) | H | H | H | —O—CH$_3$ |
| VIa-21 | —CH$_2$—CH(CH$_3$)(CH$_3$) | —CH$_2$—CH(CH$_3$)(CH$_3$) | —CH=CH—CH=CH— | | H | H |
| VIa-22 | —C$_4$H$_9$ | —C$_4$H$_9$ | H | H | CH$_2$—CH=CH— | |
| VIa-23 | CH$_2$—CH(CH$_3$)(CH$_3$) | CH$_2$—CH(CH$_3$)(CH$_3$) | —N=CH—NH— | | H | H |

More specific examples of the dye (Vb) include compounds in which $Q^1$ to $Q^3$ and $R^{207}$ to $R^{218}$ are as shown in the following Table 3. In these examples of the dye (Vb), since $Q^1$, $Q^2$, and $Q^3$ are the same group, in Table 3 they are shown together in one box. $R^{207}$ to $R^{218}$ are shown in the same manner as in Table 1. More specific examples of the dye (VIb) include compounds in which $Q^{11}$ to $Q^{13}$ and $R^{227}$ to $R^{228}$ are as shown in the following Table 4. In these examples of the dye (VIb), since $Q^{11}$, $Q^{12}$, and $Q^{13}$ are the same group, in Table 4 they are shown together in one box. $R^{227}$ to $R^{238}$ are shown in the same manner as in Table 2.

Although Xa$^-$ and Xb$^-$ are not shown in Tables 3 and 4, in each compound, Xa$^-$ and Xb$^-$ are the same as in the dye (Va) shown in Table 1. In Tables 3 and 4, all alkyl groups such as —C$_4$H$_9$ are a straight chain alkyl group.

TABLE 3

| Dye code | $Q^1, Q^2, Q^3$ | $R^{207}, R^{211}, R^{215}$ | $R^{208}, R^{212}, R^{216}$ | $R^{209}, R^{213}, R^{217}$ | $R^{210}, R^{214}, R^{218}$ |
|---|---|---|---|---|---|
| Vb-1 | —CH$_2$—CH$_2$—CH$_2$—CH$_2$— | H | H | H | H |
| Vb-2 | —CH$_2$—CH$_2$—CH$_2$—CH$_2$— | H | H | H | —CH$_3$ |
| Vb-3 | CH$_2$—CH$_2$—CH$_2$—CH$_2$— | H | —CH$_3$ | H | H |
| Vb-4 | —CH$_2$—CH(C$_2$H$_5$)—CH(C$_2$H$_5$)—CH$_2$— | H | H | H | H |

TABLE 3-continued

| Dye code | Substituent Q$^1$, Q$^2$, Q$^3$ | R$^{207}$, R$^{211}$, R$^{215}$ | R$^{208}$, R$^{212}$, R$^{216}$ | R$^{209}$, R$^{213}$, R$^{217}$ | R$^{210}$, R$^{214}$, R$^{218}$ |
|---|---|---|---|---|---|
| Vb-5 | —CH$_2$—CH(C$_2$H$_5$)—CH(C$_2$H$_5$)—CH$_2$— | H | H | H | CH$_3$ |
| Vb-6 | —CH$_2$—CH(C$_4$H$_9$)—CH(C$_4$H$_9$)—CH$_2$— | H | H | H | H— |

TABLE 4

| Dye code | Substituent Q$^{11}$ Q$^{12}$ Q$^{13}$ | R$^{227}$, R$^{231}$, R$^{235}$ | R$^{228}$, R$^{232}$, R$^{236}$ | R$^{239}$, R$^{233}$, R$^{237}$ | R$^{230}$, R$^{234}$, R$^{238}$ |
|---|---|---|---|---|---|
| VIb-1 | —CH$_2$—CH$_2$—CH$_2$—CH$_2$— | H | H | H | H |
| VIb-2 | —CH$_2$—CH$_2$—CH$_2$—CH$_2$— | H | H | H | —CH$_3$ |
| VIb-3 | —CH$_2$—CH$_2$—CH$_2$—CH$_2$— | H | —CH$_3$ | H | H |
| VIb-4 | —CH$_2$—CH(C$_2$H$_5$)—CH(C$_2$H$_5$)—CH$_2$— | H | H | H | H |
| VIb-5 | —CH$_2$—CH(C$_2$H$_5$)—CH(C$_2$H$_5$)—CH$_2$— | H | H | H | CH$_3$ |
| VIb-6 | —CH$_2$—CH(C$_4$H$_9$)—CH(C$_4$H$_9$)—CH$_2$— | H | H | H | H— |

Among the above examples of the dye (Va) as the dye (V), the dyes (Va-5Sb), (Va-5NS), (Va-5P), (Va-5C1), (Va-5B), (Va-1NS), (Va-4Sb), (Va-4NS), (Va-4P), (Va-7NS), (Va-7P), etc. are preferable.

Among the above examples of the dye (Vb), the dyes (Vb-1Sb), (Vb-1NS), (Vb-1P), etc. are preferable.

Among the above examples of the dye (VIa) of the dye (VI), the dyes (VIa-5Sb), (VIa-5NS), (VIa-5P), (VIa-5Cl), (VIa-5B), (VIa-1NS), (VIa-4Sb), (VIa-4NS), (VIa-4P), (VIa-7NS), (VIa-7P), etc. are preferable.

Among the above examples of the dye (VIb), the dyes (VIb-1b), (VIb-1NS), (VIb-1P), etc. are preferable.

Each of the dyes (V) and (VI) can be manufactured by a known method. For example, the dyes (Va) and (Vb) can be manufactured by a method disclosed in JP-A-2007-197492. For example, the dyes (VIa) and (VIb) can be manufactured by a method disclosed As each of the dyes (I) to (VI), one dye may be used alone or two or more dyes may be used as a mixture.

<Resin>

The resin included in the resin layer preferably has the glass transition temperature (Tg) of 100° C. or higher, even preferably 135° C. or higher. In the case where the glass transition temperature of the resin is in this range, the thermal motion of the dye in the resin at a high temperature can be reduced and the heat resistance of the dye can thereby be kept high.

Although there are no particular limitations on the upper limit of the glass transition temperature, the glass transition temperature is preferably 500° C. or lower from the viewpoint of the moldability etc.

The resin preferably transmits light in a wavelength range of 400 to 700 nm, that is, visible light.

There are no particular limitations on the kind of the resin. For example, from the viewpoint of satisfying the transparency in a visible range (T400-T700), heat resistance, and a glass transition temperature, one or more resins selected from the group consisting of epoxy, a cycloolefin polymer, polyimide, polycarbonate, polyester, and acrylic is preferable. Among these resins, polyimide and polyester are particularly preferable from the viewpoints of the adhesion to the reflectance adjustment films, heat resistance, and the transmittance in a visible range.

The resin layer may include a dye other than the above-described near-infrared absorbing dye (X) in such a range that the advantages of the invention are not impaired. Examples of the dye include an ultraviolet absorbing dye.

The ultraviolet absorbing dye (UV dye) is preferably a compound having a maximum absorption wavelength in 350 to 450 nm when its spectral transmittance is measured by dissolving the dye in dichloromethane. A UV-side oblique incidence property can be improved in the case where an absorption layer includes the ultraviolet absorbing dye. Specific examples of the UV dye include an oxazole-based dye, a merocyanine-based dye, a cyanine-based dye, a naphthalimide-based dye, an oxadiazole-based dye, an oxazine-based dye, an oxazolidine-based dye, a naphthalic acid-based dye, a styryl-based dye, an anthracene-based dye, a cyclic carbonyl-based dye, and a triazole-based dye. Among these dyes, the oxazole-based dye and the merocyanine-based dye are preferable. Either one kind of UV dye or two or more kinds of dyes may be used as resin layer.

From the viewpoint of preventing excessive decrease of Tg of the resin layer, the content of the UV dye in the resin layer is preferably 0.01 to 20 mass %.

The resin layer may contain an optional component selected from an adherence agent, a color correction dye, a leveling agent, an antistatic agent, a heat stabilizer, a light stabilizer, an antioxidant, a dispersant, a flame retardant, a lubricant, a plasticizer, etc. in such a range that the advantages of the invention are not impaired.

From the viewpoints of height reduction of a module and handling performance, the thickness of the resin layer is preferably in a range of 20 to 150 um, even preferably 30 to 110

The resin layer can be manufactured by preparing a coating liquid in which the dye (X), a resin or resin raw material components, and individual components that are added if necessary are dissolved or dispersed, applying the coating liquid to the substrate, drying it, and curing it if necessary. In preparing a coating liquid, a dispersion medium or a solvent may be used. It is possible to manufacture a film-shaped resin layer by extrusion molding.

[Absorption Layer]

The resin layer preferably has absorption layers that are laminated on the two respective surfaces of the transparent substrate. The absorption layer preferably contains the dye (X) that is contained in the above-described resin layer and a resin.

At least one of the absorption layers preferably contain three or more kinds of dyes (X). This makes it possible to absorb light in a broad near infrared range. It is even preferable that each absorption layer contain three more kinds of dyes (X).

In the optical filter according to the invention, the thickness of each absorption layer is preferably 0.3 to 20 In the case where the absorption layer consists of plural layers, the sum of the thicknesses of the layers is preferably 0.6 to 40 µm. In the case where the thickness is 0.3 µm or larger, desired optical characteristics can be obtained. In the case where the thickness is 20 µm or smaller, the coating performance of the layer is so high that the flatness is not lowered and the absorbance is uniform in the plane. In addition, if the thickness exceeds 20 µm, the coating solvent does not evaporate easily, which may deteriorate a product. The thickness of the absorption layer is even preferably 0.5 to 15 µm. If the absorption layer is too thick, a crack or the like may develop depending on the material of the reflectance adjustment film. It is therefore further preferable that the thickness of each absorption layer be 0.8 to 10 µm. The thicknesses of the absorption layers formed on the two respective surfaces be either the same or different from each other; it is preferable that they have the same thickness from the viewpoint of warping.

For example, the absorption layer can be manufactured by preparing a coating liquid in which the dye (X), a resin or resin raw material components, and individual components added if necessary are dissolved or dispersed, applying the coating liquid to the substrate, drying it, and curing it if necessary. The substrate may be either a transparent substrate to be used in an optical filter or a peelable substrate that is used only in forming the absorption layer. It suffices that the solvent be a dispersion medium that enables stable dispersion or a solvent that enables dissolution.

The coating liquid may include voids (minute bubbles), recesses formed by sticking of foreign substances, or a surfactant for improvement in cissing or the like in a drying step. Furthermore, the coating liquid can be applied by an immersion coating method, a cast coating, a spin coating, or the like. An absorption layer is formed by applying the above-described coating liquid on a substrate and then drying it. In the case where the coating liquid contains materials of the resin, curing treatment such as heat curing or photo-curing is performed further.

The absorption layer can also be manufactured so as to assume a film shape by extrusion molding. This film may be laminated on the transparent substrate and integrated by thermocompression bonding or the like.

The optical filter may include either only one absorption layer or two or more absorption layers. In the case where the optical filter includes two or more absorption layers, the absorption layers may be either the same or different from each other in structure. For example, one layer may be an infrared absorption layer containing the dye (X) and a resin and the other layer may be a near ultraviolet absorption layer containing an ultraviolet absorbing dye and a resin.

[Transparent Substrate]

There are no particular limitations on the material of the transparent substrate except that it can transmit visible light in 400 to 700 nm. The transparent substrate may be made of a material that absorbs near infrared light or near ultraviolet light. Examples of such a material include an inorganic material such as glass or a crystal and an organic material such as a transparent resin.

Examples of glass that can be used for the transparent substrate include absorption glass (near infrared absorption glass) in which copper ions are contained in fluorophosphate-based glass, phosphate-based glass, or the like, soda lime glass, borosilicate glass, non-alkali glass, and quartz glass. It is preferable to use, as the glass, absorption glass that is suitable for a purpose. From the viewpoint of absorbing infrared light, phosphate-based glass and fluorophosphate-based glass are preferable. To take in more infrared light (in 600 to 700 nm), alkali glass, non-alkali glass, and quartz glass are preferable. The term "phosphate-based glass" includes silicophosphate glass in which part of the glass skeleton is $SiO_2$.

Chemically strengthened glass that is obtained by replacing alkali metal ions having small ion radii and existing adjacent to a main surface of a glass plate (e.g., Li ions and Na ions) with alkali metal ions having larger ion radii (e.g., Na ions or K ions for Li ions and K ions for Na ions) may be used as the glass.

Example transparent resin materials that can be used as the transparent substrate include polyester resins such as polyethylene terephthalate and polybutylene terephthalate, polyolefin resins such as polyethylene, polypropylene, and an ethylene-vinyl acetate copolymer, norbornene resins, acrylic resins such as polyacrylate and polymethylmethacrylate, urethane resins, vinyl chloride resins, fluororesins, polycarbonate resins, polyvinyl butyral resins, polyvinyl alcohol resins, and polyimide resins.

Example crystal materials that can be used as the transparent substrate include birefringence crystals such as quartz, lithium niobate, and sapphire. It is preferable that the optical characteristics of the transparent substrate be such that an optical filter obtained by laminating the above-described absorption layers, the reflectance adjustment films, etc. thereon has optical characteristics described below. A preferable crystal material is sapphire.

From the viewpoints of the optical characteristics and the shape stability that relates to long-term reliability such as mechanical properties of an optical filter to be obtained, the ease of handling during manufacture of a filter, etc., the material of the transparent substrate is preferably an inorganic material, in particular, glass or sapphire. From the viewpoint of height reduction, a resin substrate is particularly preferable.

There are no particular limitations on the shape of the transparent substrate. The transparent substrate may have a block shape, a plate shape, or a film shape. The film thickness is preferably 10 µm or larger, even preferably 15 µm or larger, for example. From the viewpoint of thickness reduction, it is preferable that the film thickness be 140 µm or smaller, even preferably 100 µm or smaller.

[Reflectance Adjustment Films]

The optical filter according to the invention is further equipped with the reflectance adjustment films. The reflectance adjustment films are laminated on the two respective main surfaces of the resin layer. In the case where the resin layer has the absorption layers and the transparent substrate, the reflectance adjustment films are each laminated on the main surfaces of the absorption layers. Since the reflectance adjustment films are laminated on the two respective surfaces, the durability and light resistance of the dye (X) are improved.

There are no particular limitations on the reflectance adjustment films except that they are layers having a function of adjusting the reflectance of incident light. The "function of adjusting the reflectance" means a function capable of imparting wavelength range selectivity or setting the reflectance or transmittance at a desired value due to the material of the films and, if they are multilayer films, the manner of their lamination.

Each of the reflectance adjustment films may have a known structure. For example, each of the reflectance adjustment films may be either a single-layer film or a multilayer film formed by laminating two or more layers on each other. Furthermore, each reflectance adjustment film may be either a dielectric film made of an inorganic material or a film made of an energy-curable resin made of an organic material.

The reflectance adjustment films are preferably multilayer films in which the sum of the numbers of layers laminated on the two surfaces of the resin layer is 20 or smaller, even preferably, 18 or smaller. It is preferable that the number of layers of a film formed on one surface of the resin layer and the number of layers of a film formed on the other surface each be 10 or smaller, even preferably 9 or smaller. Although there are no particular limitations on the lower limit because as low a number as possible is preferable, the number of layers is usually 2 or larger.

The total thickness of the reflectance adjustment films is preferably 2.6 μm or smaller, even preferably 2.4 μm or smaller. It is preferable that the thickness of a film formed on one surface of the resin layer and the thickness of a film formed on the other surface each be 1.3 μm or smaller, even preferably 1.2 μm or smaller. Although there are no particular limitations on the lower limit because as small a film thickness as possible is preferable, the film thickness is usually 0.3 μm or larger.

The warp of an optical filter can be reduced when the number of layers and the film thickness are within the above ranges.

The reflectance adjustment films preferably satisfy the following characteristics (iii-1) and (iii-2):

(iii-1) an average transmittance in 500 to 600 nm is 90% or higher; and (iii-2) an average transmittance in 700 to 850 nm is 3% or higher and 60% or lower.

In the case where the characteristic (iii-1) is satisfied, green light in 500 to 600 nm, that is, light emitted from a light source at the time of fingerprint authentication can be taken in in large amount. As for the characteristic (iii-1), the average of the transmittance is even preferably 93% or higher. In terms of an upper limit value, the higher the average of the transmittance, the more preferable.

In the case where the characteristic (iii-2) is satisfied, light in a broad near infrared range of 700 to 850 nm can be cut. That is, light in a wavelength range to produce noise at the time of fingerprint authentication can be blocked satisfactorily. As for the characteristic (iii-2), the average of the transmittance is even preferably 50% or lower. Although there are no particular limitations on the lower limit because as small an average value as possible is preferable, the average is usually 3.5% or higher from the viewpoint of avoiding impairing the transmittance in a visible range.

The above characteristics can be satisfied by making adjustments by changing the kind of the material of the reflectance adjustment films, the number of layers laminated on each other, the thickness of respective layers, the refractive index of the material, etc.

The reflectance adjustment films are preferably reflection layers or antireflection layers. The reflectance adjustment films formed on the respective surfaces may be either of the same kind or different kinds. The reflectance adjustment films may have a configuration in which one reflectance adjustment film is a reflection layer and the other reflectance adjustment film is an antireflection layer.

<Reflection Layer>

It is preferable that the reflection layer have a function of blocking light in a particular wavelength range and be a dielectric multilayer film or an organic material film. Examples of the reflection layer include one that has a wavelength selectivity to transmit visible light and mainly reflect light in a wavelength range other than the light blocking range of the resin layer or the absorption layers. The reflection layer preferably has an infrared reflection range. In this case, the reflection range of the reflection layer may include a light blocking range of the absorption layer in a near infrared range. The characteristic of the reflection layer is not limited to the above and the reflection layer may be designed so as to further block light in a predetermined wavelength range, for example, in a near ultraviolet range.

In the case where the reflection layer is a dielectric multilayer film, the dielectric multilayer film is configured in such a manner that low-refractive index dielectric films (low-refractive index films) and high-refractive index dielectric films (high-refractive index films) are laminated alternately. The refractive index of the high-refractive index films is preferably 1.6 or higher, even preferably 2.2 to 2.5. Examples of the materials of the high-refractive index films include $Ta_2O_5$, $TiO_2$, and $Nb_2O_5$. Among these, $TiO_2$ is preferable from the viewpoints of the ease of film formation, the reproducibility of film formation, the refractive index, etc., stability, etc.

On the other hand, the refractive index of the low-refractive index films is preferably smaller than 1.6, even preferably 1.45 or higher and lower than 1.55. Example of the materials of the low-refractive index films include $SiO_2$ and $SiO_xN_y$. $SiO_2$ is preferable from the viewpoints of the reproducibility of film formation, stability, economy, etc.

For example, the dielectric multilayer film may be formed by a vacuum film formation process such as CVD, sputtering, or vacuum evaporation or a wet film formation process such as spraying or dipping.

Examples of the reflection layer made of an organic material include a film made of an energy curable resin. The film made of an energy curable resin is a film that is made of a resin that can be set when receiving optical energy or thermal energy.

The film made of an energy curable resin may be either a film that is made of only the resin or a film that is adjusted in optical characteristics etc. by adding, for example, an inorganic material such as $SiO_2$. The film may be either a single-layer film or a multilayer film.

The resin constituting the energy curable resin may be a known one. Examples of the resin that can be set when receiving optical energy include acrylic resin, methacrylic resin, epoxy resin, and enethiol resin. Examples of the resin that can be set when receiving thermal energy include acrylic resin, methacrylic resin, epoxy resin, and enethiol resin.

<Antireflection Layer>

Examples of the antireflection layer include a dielectric multilayer film, an intermediate refractive index medium, and a moth-eye structure in which the refractive index changes gradually. Among these examples, the dielectric multilayer film is preferable from the viewpoints of optical efficiency and productivity. Like the reflection layer, the antireflection layer is a dielectric multilayer film or an organic material film.

[Other Constituent Elements]

The optical filter according to the invention may be equipped with other constituent elements such as a constituent element (layer) that realize absorption by, for example, inorganic fine particles that control transmission and absorption of light in a particular wavelength range. Specific examples of the material of the inorganic fine particles include ITO (indium tin oxide), ATO (antimony-doped tin oxide), cesium tungstate, and lanthanum borate. Since ITO fine particles and cesium tungstate fine particles are high in visible light transmittance and are also high in light absorbance in a broad infrared wavelength range of longer than 1200 nm, they can be used when it is necessary to block light in such an infrared wavelength range.

[Optical Filter]

The optical filter according to the invention preferably satisfy the following characteristics (iv-1) and (iv-2):

(iv-1) an average transmittance in 500 to 600 nm is 80% or higher; and (iv-2) an average transmittance in 700 to 850 nm is 10% or lower.

In the case where the characteristic (iv-1) is satisfied, the optical filter can take in a large amount of green light in 500 to 600 nm that is light emitted from a light source at the time of fingerprint authentication. It is even preferable that the average transmittance that is mentioned in the characteristic (iv-1) be 82% or higher. There are no particular limitations on the upper limit because as large an average value as possible is preferable.

In the case where the characteristic (iv-2) is satisfied, the optical filter can cut light in a broad near infrared range of 700 to 850 nm. That is, the optical filter can block light satisfactorily that is in such a wavelength range as to produce noise at the time of fingerprint authentication. It is even preferable that the average transmittance that is mentioned in the characteristic (iv-2) be 8% or lower. Although there are no particular limitations on the lower limit because as small an average value as possible is preferable, it is preferable that a near infrared light absorbing dye be added to the extent that the transmittance in a visible range is not lowered and the average transmittance is usually 0.1% or higher.

When the optical filter is applied to, for example, fingerprint detection devices, the optical filter according to the invention can provide a low-noise, high-accuracy fingerprint detection device. Therefore, the optical filter according to the invention is preferably applied to fingerprint detection devices that may be used in outdoor environment where near infrared light tends to come in, even preferably to fingerprint detection devices employed in smartphones.

The fingerprint detection device according to the invention includes the optical filter according to the invention. The fingerprint detection device according to the invention preferably includes the optical filter according to the invention, an organic light-emitting element, and an organic thin-film imaging device. The organic light-emitting element and the organic thin-film imaging device can be known ones.

EXAMPLES

The invention will be described in more detail using Examples. An ultraviolet/visible spectrophotometer (type U-4100 produced by Hitachi High Technologies Corporation) was used for measurements of various optical characteristics described below.

<Evaluation of Dyes>

A uniform resin solution was obtained by dissolving polyimide resin (C3G30-G produced by Mitsubishi Gas Chemical Company, Inc.) in a solution of cyclohexane: γ-butyrolactone (1:1) at a concentration of 8.5 mass % and stirring a resulting solution sufficiently. Each of dyes shown in the following table was added to this resin solution at a proportion of 7.5 parts by mass based on 100 parts by mass of the resin, a resulting solution was stirred for 2 hours while it was heated to 50° C., and solubility of the dye was checked.

A glass plate with a resin layer was obtained by applying a resin solution containing each dye to a glass plate (D 263 produced by SCHOTT) and then drying the resin solution. A spectral internal transmission curve was calculated using a spectral transmittance curve and a spectral reflectance curve of the glass plate with a resin layer and normalized so that a transmittance at a maximum absorption wavelength D became 10%. Furthermore, an average internal transmission in 500 to 600 nm was calculated.

The case where E>100−(D/100) or E>103.5−(D/100) was satisfied was evaluated as "○", respectively, and the case where the relationship was not satisfied was evaluated as "x".

The structure and a synthesis method or a source of purchase are as follows:

Compound A-1: Synthesized according to US-A-2014-0061505 and WO 2014/088063.

Compound A-2: Synthesized according to U.S. Pat. No. 5,543,086.

Compound A-3: Synthesized according to U.S. Pat. No. 5,543,086.

Compound A-4: Synthesized according to Japanese Patent No. 4081149.

Compound B-1: Synthesized according to WO 2017/135359.

Compound B-2: Product name 52138 produced by FEW Chemicals GmbH

Compound B-3: Product name 52137 produced by FEW Chemicals GmbH

Compounds C-1 to C-3: Synthesized according to Dyes and Pigments 73 (2007), 344-352.

Compound C-4: Synthesized according to a method described later.

Compound C-5: Synthesized according to JP-A-2019-164269.

[Chemical formulae 15]

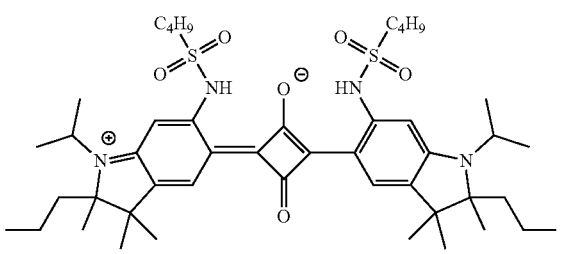

(A-1)

(A-2)
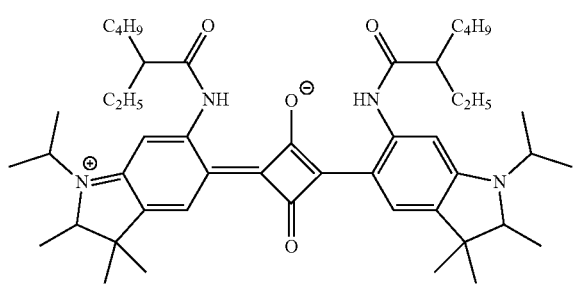
(A-3)
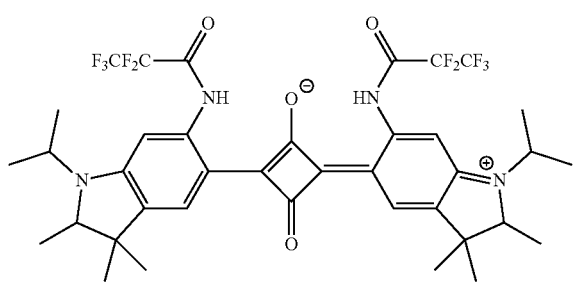
[Chemical formulae 16]
(A-4)
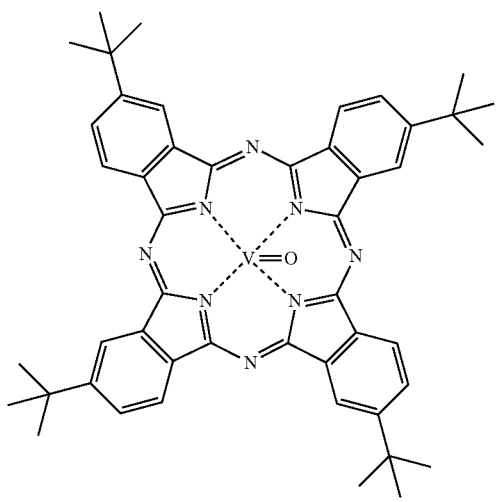
B-1
B-2
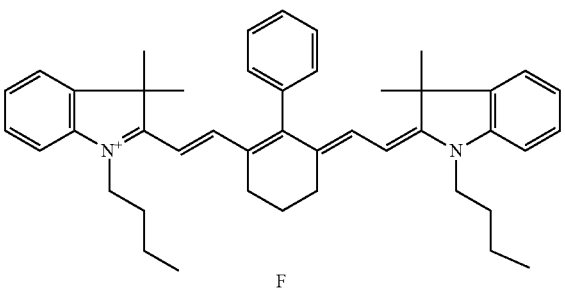
B-3
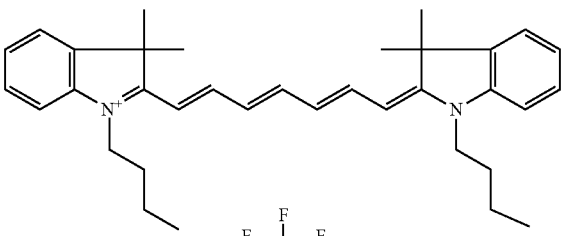
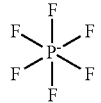
[Chemical formulae 17]
C-1
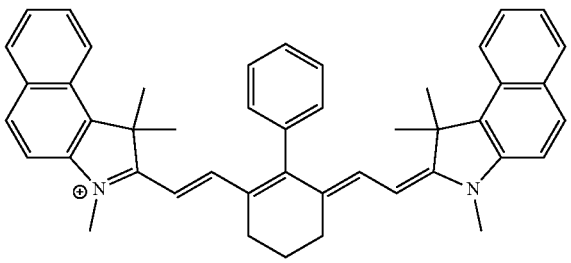
C-2
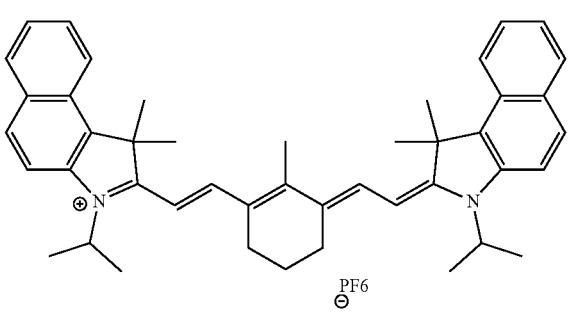

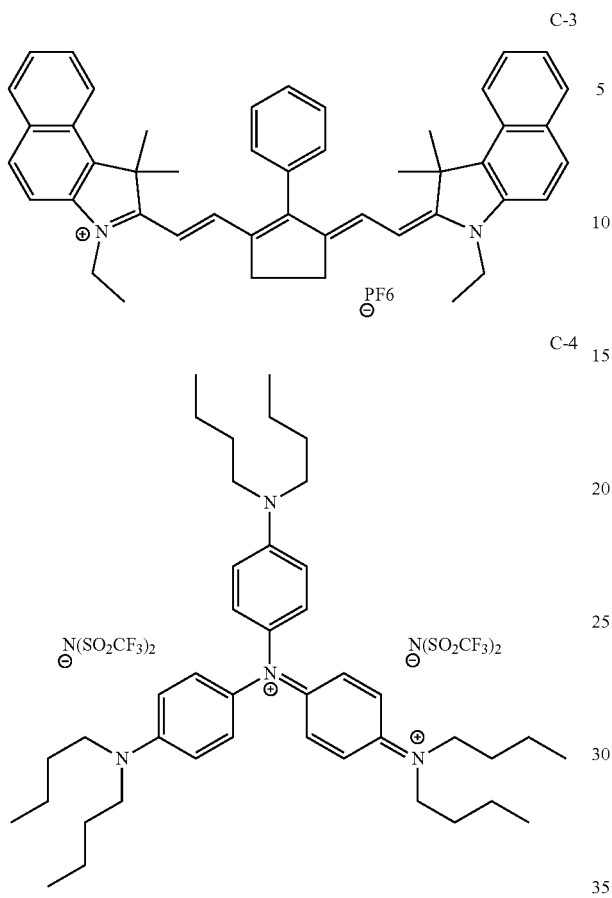

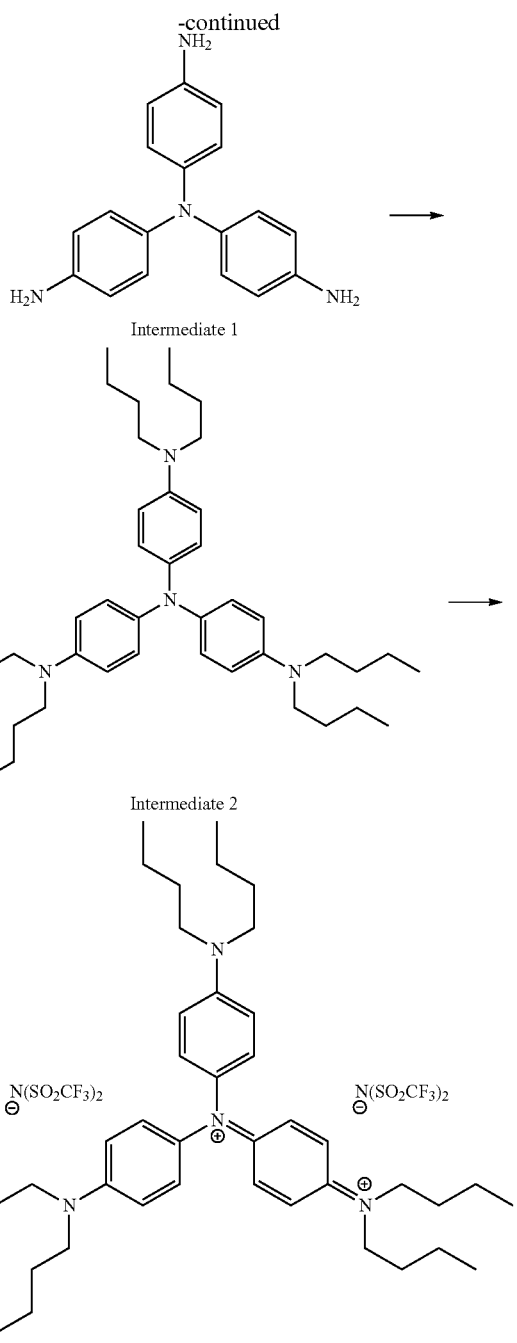

<Synthesis of C-4>
The dye C-4 was synthesized by the following method.

[Chemical formula 18]

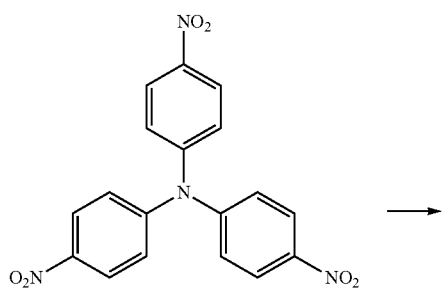

<Step 1>
Tris(4-nitrophenyl)amine (25 g, 66 mmol), palladium-active carbon (palladium 10%) (6.5 g), and 1, 4-dioxane (350 mL), and methanol (300 mL) were put into a 1 L recovery flask, the resulting solution was cooled to 0° C. and stirred, then ammonium formate (65 g, 990 mmol) was added thereto, and the resulting solution was stirred at room temperature for 4 hours. The reaction liquid was filtered, the filtrate was subjected to an extraction manipulation using dichloromethane, the solvent was removed, hexane (300 mL) was added to the remaining solid, and the resulting solution was stirred for one day and then washed. Hexane was removed by a filtering manipulation, and thus intermediate 1 of 18.1 g (yield: 95%) which was a gray solid was obtained.

<Step 2>

The intermediate 1 (15 g, 52 mmol) obtained at step 1, potassium carbonate (71.4 g, 520 mmol), 1-buromobutane (127 g, 930 mmol), and N, N-dimethylformamide (150 mL) were put into a 1 L recovery flask and the resulting solution was stirred at 115° C. for 24 hours. After the temperature was returned to room temperature, the solution was subjected to a filtering manipulation and washing with dichloromethane, the filtrate was extracted using dichloromethane, the solvent was removed, and isolation was performed by column chromatography (hexane:ethyl acetate=1000:40), and thus intermediate 2 of 23 g (yield: 71%) which was a light yellow oil-like substance was obtained.

<Step 3>

Intermediate-2 (3 g, 4.8 mmol) obtained at step 2 of Synthesis example 1 and ethyl acetate (50 mL) were put into a 500-mL recovery flask and the resulting liquid was stirred at 60° C. until Intermediate-2 was dissolved. Then a solution obtained by dissolving potassium bis(trifluoromethylsulfonyl)imide (3.8 g, 12 mmol) and ammonium peroxodisulfate (2.7 g, 12 mmol) in a mixed solution of acetonitrile (30 mL) and water (30 mL) was added to the solution of Intermediate-2 and the resulting solution was stirred at 60° C. for 4 hours. After the completion of reaction, the temperature was returned to room temperature, water (100 mL) and hexane (200 mL) were added, a solid was precipitated, filtered, and washed with ethyl acetate. The collected solid was subjected to isolation by column chromatography (dichloromethane:methanol=1000:30), the solvent was removed, a small amount of the resulting solid was dissolved in dichloromethane, and reprecipitation was performed using ethyl acetate, and thus 3.1 g of a dye C-4 (yield: 54%) which was a green solid was obtained.

Evaluation results are shown in the following table.

Figure 3:
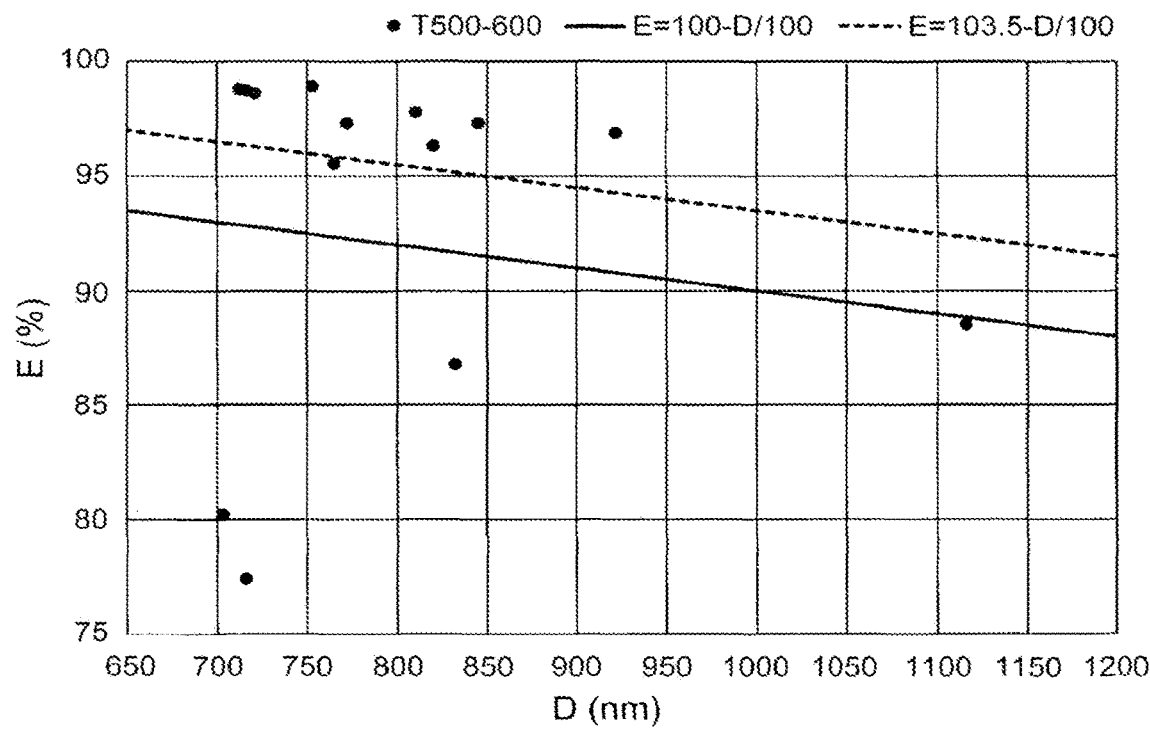
FIG. 3 is a graph in which a correlation between the maximum absorption wavelength D and the average internal transmittance E in 500 to 600 nm of dyes used in Examples is plotted.

FIG. 3 is a graph in which a correlation between D and E is plotted.

TABLE 5

| | Dye | | | | | | | | | | | |
|---|---|---|---|---|---|---|---|---|---|---|---|---|
| | A-1 | A-2 | A-3 | A-4 | B-1 | B-2 | B-3 | C-1 | C-2 | C-3 | C-4 | C-5 |
| Solubility | ○ | ○ | ○ | ○ | ○ | ○ | ○ | ○ | ○ | ○ | ○ | ○ |
| D (nm) | 712 | 716 | 721 | 703 | 753 | 772 | 765 | 810 | 820 | 845 | 922 | 832 |
| E (%) | 98.8 | 98.7 | 98.6 | 80.2 | 98.9 | 97.3 | 95.5 | 97.8 | 96.3 | 97.3 | 96.9 | 86.8 |
| 100 − (D/100) | 92.9 | 92.8 | 92.8 | 93.0 | 92.5 | 92.3 | 92.4 | 91.9 | 91.8 | 91.6 | 90.8 | 91.7 |
| E > 100 − (D/100) | ○ | ○ | ○ | x | ○ | ○ | ○ | ○ | ○ | ○ | ○ | x |
| 103.5 − (D/100) | 96.4 | 96.3 | 96.3 | — | 96.0 | 95.8 | 95.9 | 95.4 | 95.3 | 95.1 | 94.3 | — |
| E > 103.5 − (D/100) | ○ | ○ | ○ | — | ○ | ○ | x | ○ | ○ | ○ | ○ | — |

Examples 1-1 to 1-15

Spectral Characteristics of Resin Layer

A spectral internal transmittance curve of a resin layer having 1-μm-thick absorption layers containing a dye and polyimide resin (C3G30G produced by Mitsubishi Gas Chemical Company, Inc.) on the two respective surfaces of a 30 μm-thick transparent substrate made of polyimide resin (L-3G30 produced by Mitsubishi Gas Chemical Company, Inc.) was obtained.

The concentration (mass %) of each of the dyes in the absorption layers and spectral characteristics of each of the resin layers are shown in the following table.

Examples 1-1 to 1-10 are Inventive Examples and Examples 1-11 to 1-15 are Comparative Examples.

Figure 4:
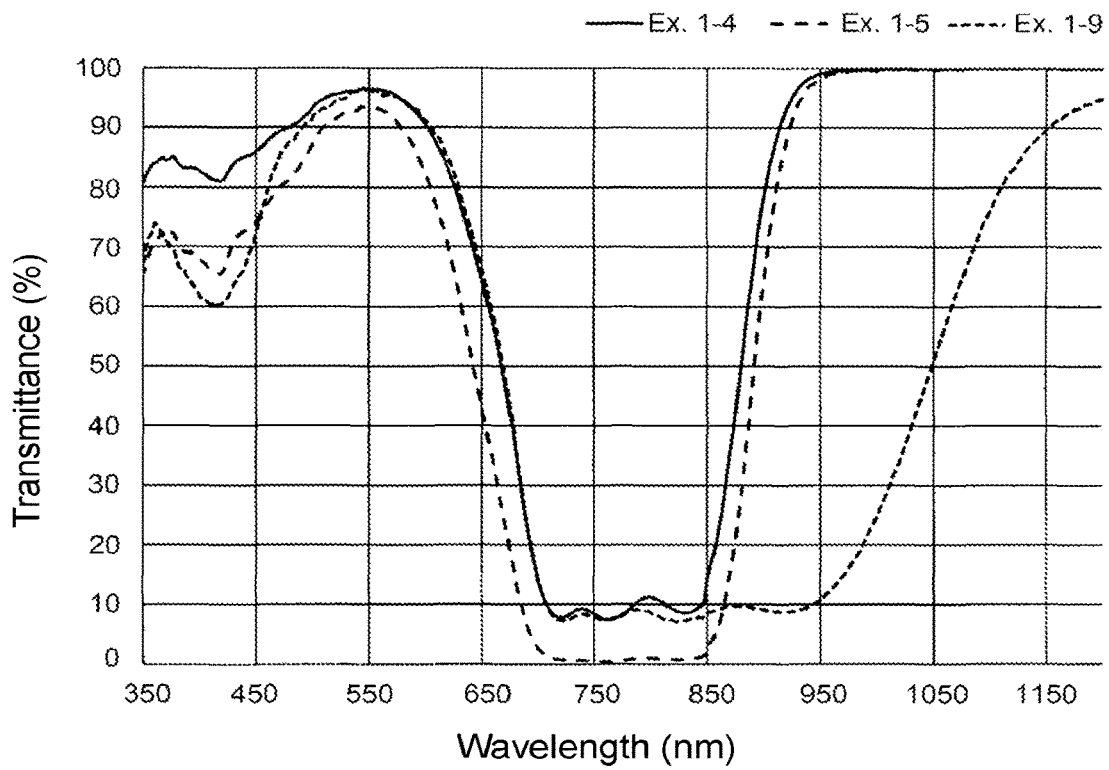
FIG. 4 is a graph showing spectral internal transmittance curves of resin layers of Examples 1-4, 1-5, and 1-9.
Figure 5:
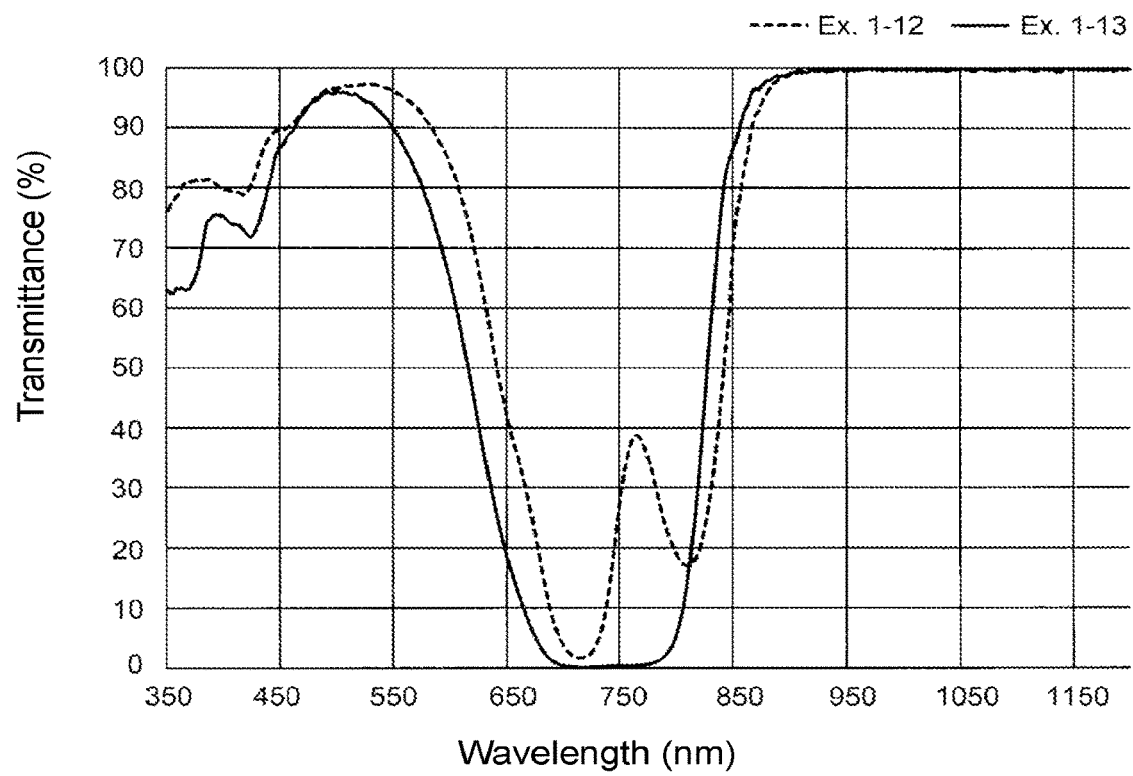
FIG. 5 is a graph showing spectral internal transmittance curves of resin layers of Examples 1-12 and 1-13.

FIG. 4 shows spectral internal transmittance curves of the resin layers of Examples 1-4, 1-5, and 1-9 and FIG. 5 shows spectral internal transmittance curves of the resin layers of Examples 1-12 and 1-13.

TABLE 6

| | | Ex. 1-1 | Ex. 1-2 | Ex. 1-3 | Ex. 1-4 | Ex. 1-5 | Ex. 1-6 | Ex. 1-7 | Ex. 1-8 |
|---|---|---|---|---|---|---|---|---|---|
| Dye A | A-1 | 0.68 | | 0.45 | 1.13 | 1.88 | | | 0.63 |
| | A-2 | | 0.9 | | | | | | |
| | A-3 | | | 0.75 | | | 1.88 | 1.88 | |
| | A-4 | | | | | | | | |
| Dye B | B-1 | 0.3 | 0.45 | | 0.6 | 1.5 | 1.95 | | 0.39 |
| | B-2 | 0.21 | 0.45 | | 0.45 | 0.75 | 1.5 | | |
| | B-3 | | | 1.13 | | | | 3 | |
| Dye C | C-1 | 0.3 | 0.6 | 0.3 | 0.6 | 1.65 | | | 0.15 |
| | C-2 | | 1.05 | | | | | | |
| | C-3 | 1.2 | 0.75 | 2.1 | 2.1 | 3.75 | 5.65 | 5.65 | 0.3 |
| | C-4 | | | | | | | | 5.5 |
| | C-5 | | | | | | | | |
| T500-600. | | 97.3 | 95.2 | 94.2 | 95.0 | 90.6 | 89.0 | 86.8 | 97.0 |
| Ave > 85% | | ○ | ○ | ○ | ○ | ○ | ○ | ○ | ○ |

TABLE 6-continued

| | | | | | | | | | |
|---|---|---|---|---|---|---|---|---|---|
| T700-850. | 32.9 | 28.3 | 16.4 | 13.8 | 2.6 | 3.8 | 3.5 | 34.1 |
| Max < 35% | ○ | ○ | ○ | ○ | ○ | ○ | ○ | ○ |
| T700-850.Max-Min < 20% | 8.7 | 18.7 | 7.8 | 6.4 | 2.1 | 3.7 | 3.1 | 10.0 |
| | ○ | ○ | ○ | ○ | ○ | ○ | ○ | ○ |
| OD500-600/OD700-850 < 0.05 | 0.022 | 0.023 | 0.027 | 0.021 | 0.021 | 0.024 | 0.029 | 0.023 |
| | ○ | ○ | ○ | ○ | ○ | ○ | ○ | ○ |
| T700-850.Ave | 27.71 | 11.67 | 10.66 | 9.29 | 0.88 | 0.70 | 0.71 | 26.05 |

| | | Ex. 1-9 | Ex. 1-10 | Ex. 1-11 | Ex. 1-12 | Ex. 1-13 | Ex. 1-14 | Ex. 1-15 |
|---|---|---|---|---|---|---|---|---|
| Dye A | A-1 | 1.13 | 2.1 | 3 | | | | |
| | A-2 | | | | | | | |
| | A-3 | | | | 3.75 | 3.75 | 1.88 | |
| | A-4 | | | | | | | 5.25 |
| Dye B | B-1 | 0.75 | 1.65 | | | | | 1.95 |
| | B-2 | | | | | | | 1.5 |
| | B-3 | | | | | 4.88 | 3 | |
| Dye C | C-1 | 0.3 | 0.6 | | 1.8 | | | |
| | C-2 | | | | | | | |
| | C-3 | 0.6 | 0.6 | | 3.75 | | | 5.65 |
| | C-4 | 10 | 20 | | | | | |
| | C-5 | | | | | | 4.5 | |
| T500-600.Ave > 85% | | 94.5 | 90.0 | 98.1 | 94.2 | 86.6 | 70.2 | 78.6 |
| | | ○ | ○ | ○ | ○ | ○ | x | x |
| T700-850.Max < 35% | | 14.0 | 2.3 | 100.4 | 69.2 | 86.6 | 3.0 | 3.0 |
| | | ○ | ○ | x | x | x | ○ | ○ |
| T700-850.Max-Min < 20% | | 6.9 | 1.8 | 97.9 | 67.5 | 86.4 | 2.8 | 2.9 |
| | | ○ | ○ | x | x | x | ○ | ○ |
| OD500-600/OD700-850 < 0.05 | | 0.023 | 0.022 | 0.056 | 0.040 | 0.078 | 0.071 | 0.049 |
| | | ○ | ○ | x | o | x | x | ○ |
| T700-850.Ave | | 8.18 | 0.88 | 70.48 | 22.84 | 15.74 | 0.71 | 0.72 |

The meanings of the abbreviations used in the table are as follows:

T500-600.Ave: average internal transmittance in 500 to 600 nm;

T700-850.Max: maximum internal transmittance in 700 to 850 nm;

T700-850.Max-Min: difference between a maximum internal transmittance and a minimum internal transmittance in 700 to 850 nm;

OD500-600: average optical density of the internal transmittance in 500 to 600 nm;

OD700-850: average optical density of the internal transmittance in 700 to 850 nm; and T700-850.Ave: average internal transmittance in 700 to 850 nm.

It is seen from the above results that high transmittance in 500 to 600 nm and high absorbance in 700 to 850 nm can be satisfied more sufficiently by combining plural dyes having different maximum absorption wavelengths in a near infrared range, and by combining three or more dyes rather than two. It is seen from the comparison between Examples 1-7 and 1-14 that a resin layer having superior optical characteristics can be obtained if more dyes that satisfy the relationship E>100−(D/100) are used. Furthermore, it is seen from the comparison between Examples 1-6 and 1-7 that a resin layer that has superior optical characteristics, in particular, exhibits high transmittance in 500 to 600 nm can be obtained if the dyes satisfy the relationship E>103.5−(D/100).

<Light Resistance Test>

A glass substrate with a resin layer was manufactured using each of dyes shown in the following table in the same manner as employed in the above section <Evaluation of dyes>.

A light resistance test sample was manufactured by forming a 7-layer antireflection film (thickness: 0.34 μm) on a surface of each absorption layer, the surface being not in contact with the glass plate.

In the light resistance test, the sample was irradiated with light from the surface of the antireflection film under the following conditions using a super xenon weather meter of product name SX75 (produced by Suga Test Instruments Co., Ltd):

Wavelength: 300 to 400 nm;

Temperature: 40° C.;

Humidity: 50% RT; and

Cumulative amount of light: 6.0 kW·hour/m².

A spectral transmittance curve was measured before and after the irradiation and a dye remaining rate was calculated according to the following equation.

Dye remaining rate (%)={(absorbance at maximum absorption wavelength after irradiation)/(absorbance at maximum absorption wavelength before irradiation)×100 (Evaluation criterion)

○: Dye remaining rate being higher than or equal to 75% x: Dye remaining rate being lower than 75%

Results are shown in the following table.

TABLE 7

| | | Light resistance test | |
|---|---|---|---|
| Dye A | A-1 | 82.7 | ○ |
| | A-2 | 83.5 | ○ |
| | A-3 | 65.0 | x |
| Dye B | B-1 | 92.0 | ○ |
| | B-2 | 95.5 | ○ |
| | B-3 | 91.4 | ○ |
| Dye C | C-1 | 89.1 | ○ |
| | C-2 | 75.9 | ○ |
| | C-3 | 98.5 | ○ |
| | C-5 | 72.6 | x |

It is seen from the above results that the dyes A-3 and C-5 are low in light resistance.

Examples 2-1 and 2-2

Spectral Characteristics of Optical Filter (1) A spectral characteristic of an optical filter was evaluated by multiplying together a spectral internal transmittance curve of a resin layer and spectral transmittance curves of reflectance adjustment films.

The optical filter was configured in such a manner that reflectance adjustment films which were multilayer films were laminated on the two respective surfaces of the resin layer. The resin layer was configured in such a manner that absorption layers are laminated on the two respective surfaces of a transparent substrate.

The transparent substrate was made of polyimide resin (L-3G30 produced by Mitsubishi Gas Chemical Company, Inc.) and had a thickness of 30 µm.

Each absorption layer was given the same structure as each absorption layer of the resin layer of Example 1-4 and its thickness was set at 1 µm.

Each of multilayer films (1) and (2) was a film in which $SiO_2$ films and $TiO_2$ films were laminated alternately. The number of layers laminated and the film thickness were as shown in the following table.

Figure 6:
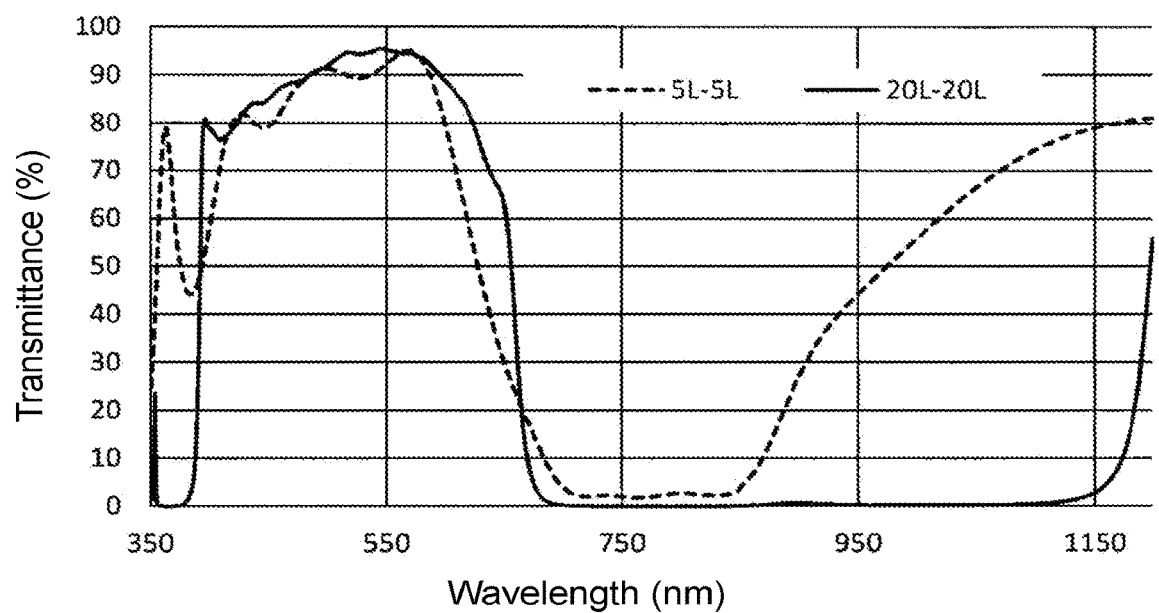
FIG. 6 shows a graph showing spectral transmittance curves of optical filters of Examples 2-1 and 2-2.

Optical characteristics of each optical filter are shown in the following table and FIG. 6.

Both of Examples 2-1 and 2-2 are Inventive Examples.

TABLE 8

|  |  | Example 2-1 | Example 2-2 |
|---|---|---|---|
| Unit configuration | Multilayer film (1) | 5 layers/0.424 µm | 20 layers/2.233 µm |
|  | Resin layer | Absorption layer (Ex. 1-4)/1 µm | Absorption layer (Ex. 1-4)/1 µm |
|  |  | Transparent substrate/30 µm | |
|  |  | Absorption layer (Ex. 1-4)/1 µm | Absorption layer (Ex. 1-4)/1 µm |
|  | Multilayer film (2) | 5 layers/0.424 µm | 20 layers/2.233 µm |
|  | T500-600.Ave | 90.76 | 93.70 |
|  | T700-850.Ave | 2.309 | 0.024 |

The meanings of the abbreviations used in the table are as follows:

T500-600.Ave: Average transmittance in 500 to 600 nm;

T700-850.Ave: Average transmittance in 700 to 850 nm.

It is seen from the above table that both of the optical filters that are different from each other in the number of layers and the thickness of each reflectance adjustment film are superior in the optical characteristics.

Examples 3-1 and 3-2

Warp of Optical Filter

A radius of curvature and an in-plane thickness distribution of each optical filter in which only multilayer film (1) was formed on a resin layer were evaluated by the following method.

Absorption layers having a thickness of 1 µm were formed on the two surfaces of an 80-µm-thick transparent substrate having a size of 76 m×76 mm (made of polycarbonate resin (M5 film produced by Teijin Limited)), and a 6.67-µm-thick dielectric multilayer film in which $SiO_2$ films and $TiO_2$ films were laminated alternately was formed as the multilayer film (1). A proportion of $SiO_2$ in the multilayer film (1) was determined from design data of the multilayer film. A warp of a resulting optical filter was measured using a scale and a radius of curvature and a curvature were calculated. The structure of the absorption layers was the same as in the resin layer of Example 1-4.

Furthermore, the optical filter was cut at two points, that is, the center in the plane of the multilayer film and a position that is distant from the center by 35 mm, and an in-plane thickness distribution was determined by measuring thickness values at the two points by a cross-sectional SEM (FE-SEM S-4800 produced by Hitachi High Technologies Corporation)

Curvature and an in-plane thickness distribution of the optical filter having the configuration shown in the following table, that is, the optical filter in which the multilayer film (1) was formed on the surface of one of the absorption layers, were estimated from measurement values obtained in the above-described manner according to the Stoney's equation.

Examples 3-1 and 3-2 are Inventive Examples.

TABLE 9

|  |  | Example 3-1 | Example 3-2 |
|---|---|---|---|
| Device configuration | Multilayer film (1) | 5 layers/0.424 µm | 20 layers/2.233 µm |
|  | Resin layer | Absorption layer (Ex. 1-4)/1 µm | Absorption layer (Ex. 1-4)/1 µm |
|  |  | Transparent substrate/30 µm | |
|  |  | Absorption layer (Ex. 1-4)/1 µm | Absorption layer (Ex. 1-4)/1 µm |
|  | Curvature | 0.05 | 0.25 |
|  | Thickness distribution | 1 | 20.7 |

Whereas Examples 2-1 and 2-2 showed superior optical characteristics, it is seen that the optical filter of Example 3-1 that is smaller in the number of layers of the multilayer film is smaller in curvature and lower in the degree of distribution of the film thickness than the optical filter of Example 3-2 and hence is smaller in warp.

Although the invention has been described above in detail with reference to the particular embodiments, it is apparent to those skilled in the art that various changes and modifications are possible without departing from the spirit and scope of the invention. The present application is based on Japanese Patent Application No. 2019-207414 filed on Nov. 15, 2019, the disclosure of which is incorporated herein by reference.

INDUSTRIAL APPLICABILITY

The optical filter according to the invention can increase the transmittance of light emitted from a light source and being necessary for fingerprint authentication while reducing, in a broad range, the transmission of near infrared light that may produce noise against fingerprint authentication. Therefore, the optical filter according to the invention can increase the accuracy of fingerprint authentication and hence is very useful when applied to fingerprint detection devices that are incorporated in smartphones, which are used also outdoors.

DESCRIPTION OF SYMBOLS

1: Resin layer
3a, 3b: Reflectance adjustment film
11: Transparent substrate
12a, 12: Absorption layer
10: Optical filter

The invention claimed is:

1. An optical filter comprising:
a transparent substrate; and
an absorption layer formed on the transparent substrate and comprising at least one dye having a maximum absorption wavelength in a wavelength range of 750 or longer and shorter than 800 nm,
wherein a laminate of the transparent substrate and the absorption layer has a maximum internal transmittance of 35% or lower in a wavelength range of 700 to 850 nm, a difference of 10% or smaller between the maximum internal transmittance and a minimum internal transmittance in the wavelength range of 700 to 850 nm, and OD(A)/OD(B)<0.07 where the OD(A) is an average optical density of an internal transmittance in a wavelength range of 500 to 600 nm, and the OD(B) is an average optical density of an internal transmittance in the wavelength range of 700 to 850 nm, the absorption layer has a thickness of 20 μm or smaller, and the optical filter has an average transmittance of 82% or higher in the wavelength range of 500 to 600 nm.

2. The optical filter according to claim 1, wherein the optical filter has an average transmittance of 80% or higher in the wavelength range of 500 to 600 nm, and an average transmittance of 10% or lower in the wavelength range of 700 to 850 nm.

3. The optical filter according to claim 1, further comprising:
a first reflectance adjustment film formed on the absorption layer.

4. The optical filter according to claim 3, further comprising:
a second reflectance adjustment film formed on a main surface of the transparent substrate on an opposite side with respect to a surface on which the first reflectance adjustment film is formed.

5. The optical filter according to claim 4, wherein the second reflectance adjustment film has a thickness of 1.3 μm or smaller.

6. The optical filter according to claim 5, wherein the second reflectance adjustment film is a dielectric multilayer film configured to block light in a near ultraviolet range.

7. The optical filter according to claim 3, wherein the first reflectance adjustment film has a thickness of 1.3 μm or smaller.

8. The optical filter according to claim 7, wherein the first reflectance adjustment film is a dielectric multilayer film configured to block light in a near ultraviolet range.

9. The optical filter according to claim 1, wherein the at least one dye includes a compound having a maximum absorption wavelength in a wavelength range of 750 nm or longer and shorter than 800 nm.

10. The optical filter according to claim 9, wherein the at least one dye includes a plurality of dyes.

11. The optical filter according to claim 9, wherein the compound satisfies an internal transmittance of 10% at a maximum absorption wavelength in a spectral internal transmittance curve that is measured by dissolving the compound in a resin, and E>100−(D/100), where D in nm is the maximum absorption wavelength and E is an average internal transmittance in the wavelength range of 500 to 600 nm.

12. The optical filter according to claim 9, wherein the compound is at least one dye selected from the group consisting of a squarylium dye and a cyanine dye.

13. The optical filter according to claim 1, wherein the laminate of the transparent substrate and the absorption layer has the difference of 10% or smaller between the maximum internal transmittance and the minimum internal transmittance in the wavelength range of 700 to 850 nm.

14. An optical filter comprising:
a transparent substrate;
an absorption layer on the transparent substrate and comprising at least one dye having a maximum absorption wavelength in a wavelength range of 750 or longer and shorter than 800 nm such that the absorption layer has a thickness in a range of 0.3 to 20 μm;
a first reflectance adjustment film formed on the absorption layer and comprising a dielectric multilayer film configured to block light in a near ultraviolet range such that the first reflectance adjustment film has a thickness of 1.3 μm or smaller; and
a second reflectance adjustment film formed on a main surface on an opposite side with respect to a surface on which the first reflectance adjustment film is formed, and comprising dielectric multilayer film such that the second reflectance adjustment film has a thickness of 1.3 μm or smaller,
wherein a laminate of the transparent substrate and the absorption layer has a maximum internal transmittance of 35% or lower in a wavelength range of 700 to 850 nm, and a difference of 10% or smaller between the maximum internal transmittance and a minimum internal transmittance in the wavelength range of 700 to 850 nm, and the optical filter has an average transmittance of 82% or higher in the wavelength range of 500 to 600 nm.

15. The optical filter according to claim 14, wherein the at least one dye includes a compound having a maximum absorption wavelength in a wavelength range of 750 nm or longer and shorter than 800 nm.

16. The optical filter according to claim 15, wherein the at least one dye includes a plurality of dyes.

17. The optical filter according to claim 15, wherein the compound satisfies an internal transmittance of 10% at a maximum absorption wavelength in a spectral internal transmittance curve that is measured by dissolving the compound in a resin, and E>100−(D/100), where D in nm is the maximum absorption wavelength and E is an average internal transmittance in a wavelength range of 500 to 600 nm.

18. The optical filter according to claim 15, wherein the compound is at least one dye selected from the group consisting of a squarylium dye and a cyanine dye.

19. The optical filter according to claim 14, wherein the laminate of the transparent substrate and the absorption layer has the difference of 10% or smaller between the maximum internal transmittance and the minimum internal transmittance in the wavelength range of 700 to 850 nm.

* * * * *